Dec. 1, 1936.    J. F. GAIL    2,062,359
METHOD OF AND APPARATUS FOR MAKING MATTRESS BOXING STRIPS
Filed Sept. 21, 1931    16 Sheets-Sheet 1

Inventor
John F. Gail
By Fisher, Clapp, Soans & Pond
Attys.

Dec. 1, 1936.  J. F. GAIL  2,062,359
METHOD OF AND APPARATUS FOR MAKING MATTRESS BOXING STRIPS
Filed Sept. 21, 1931  16 Sheets-Sheet 2

Inventor
John F. Gail
By Fisher, Clapp, Soans & Pond
Attys.

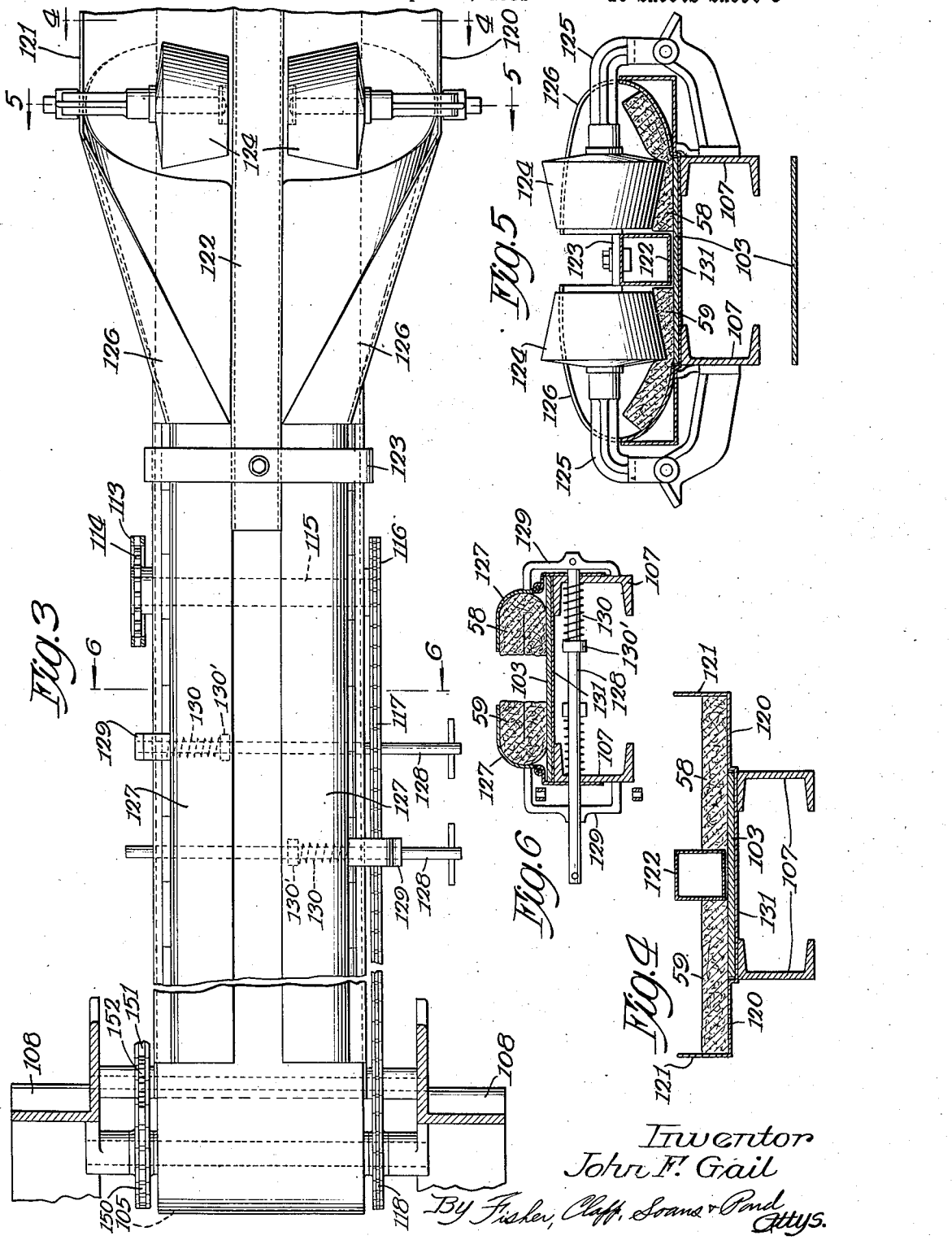

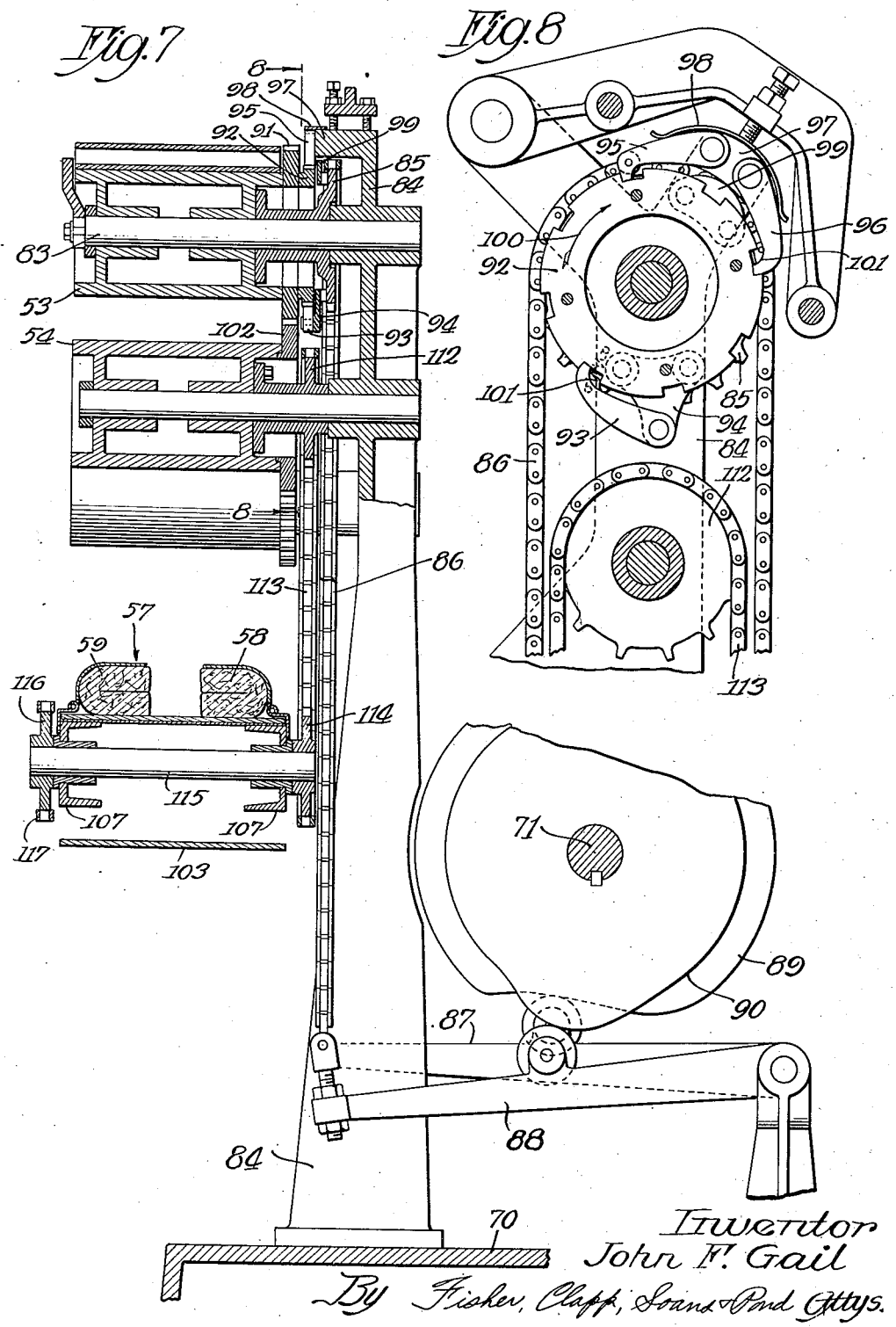

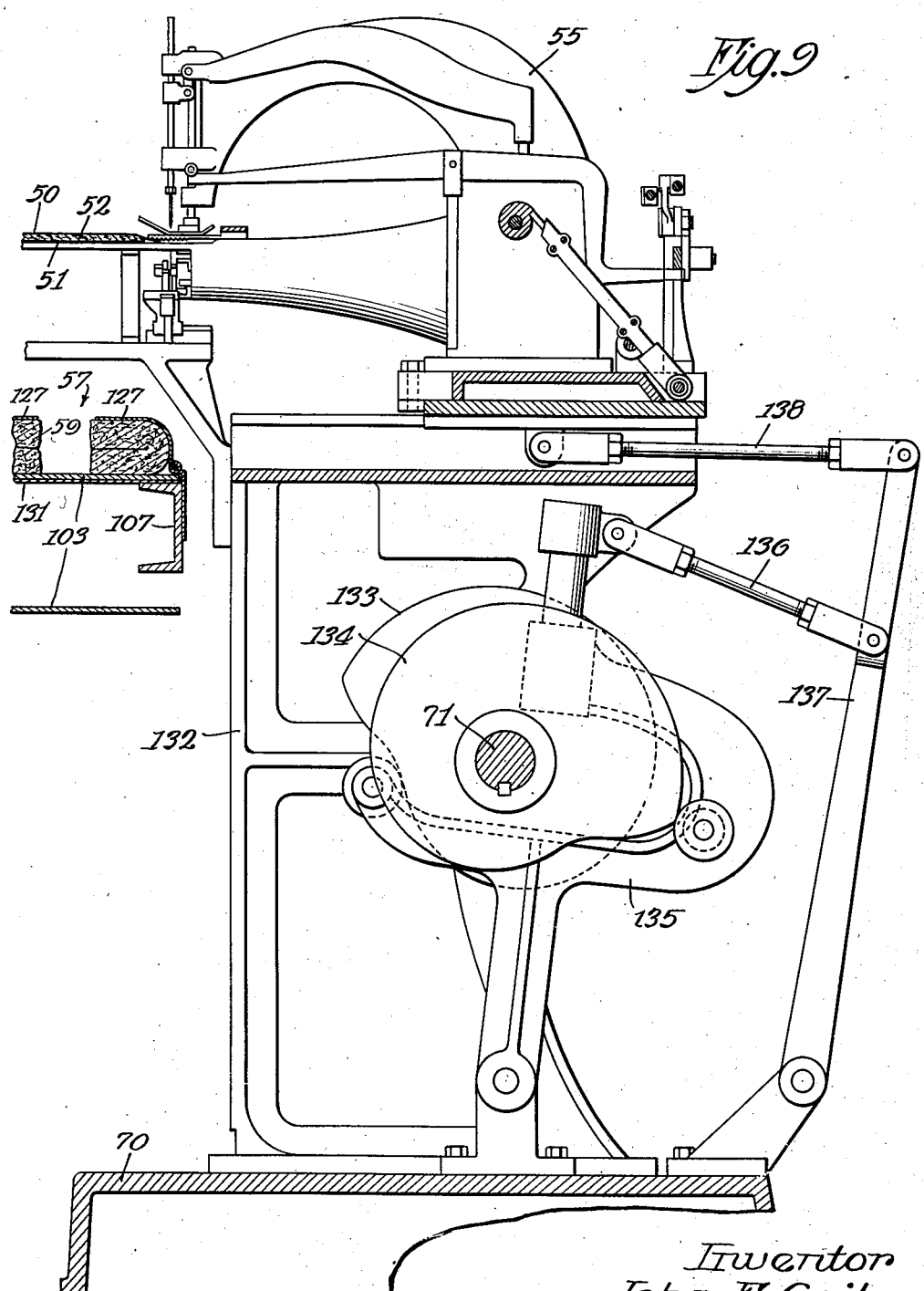

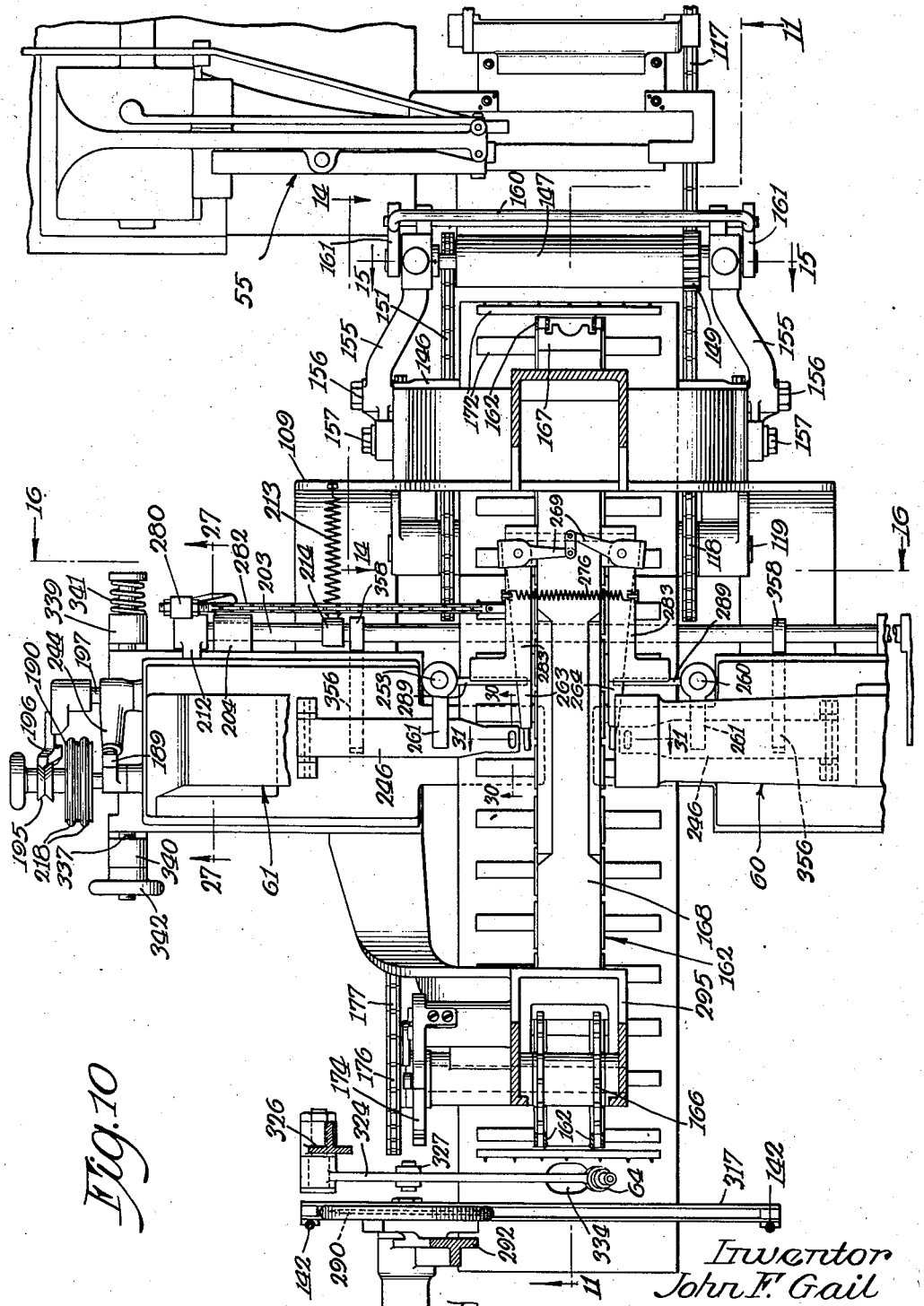

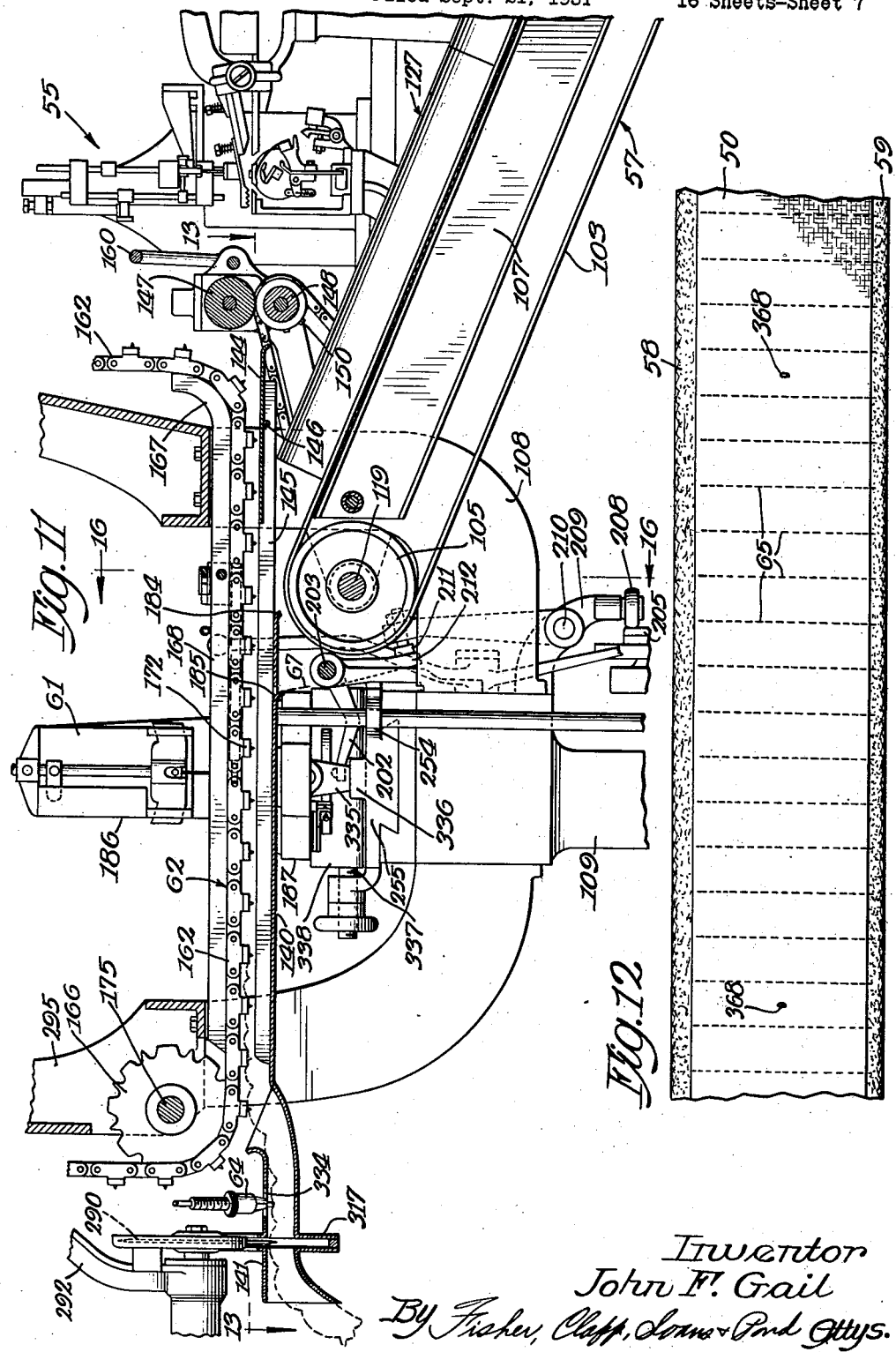

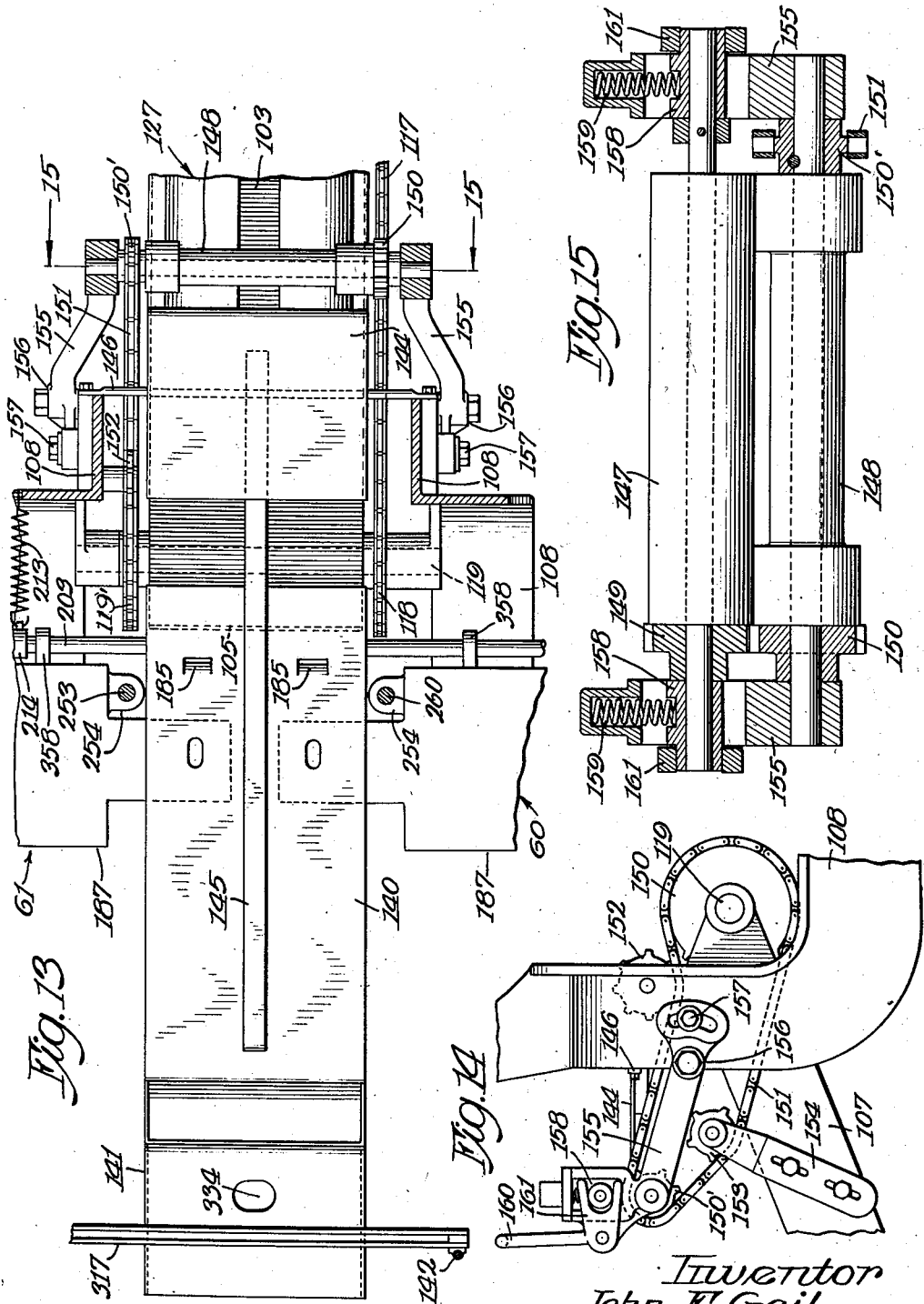

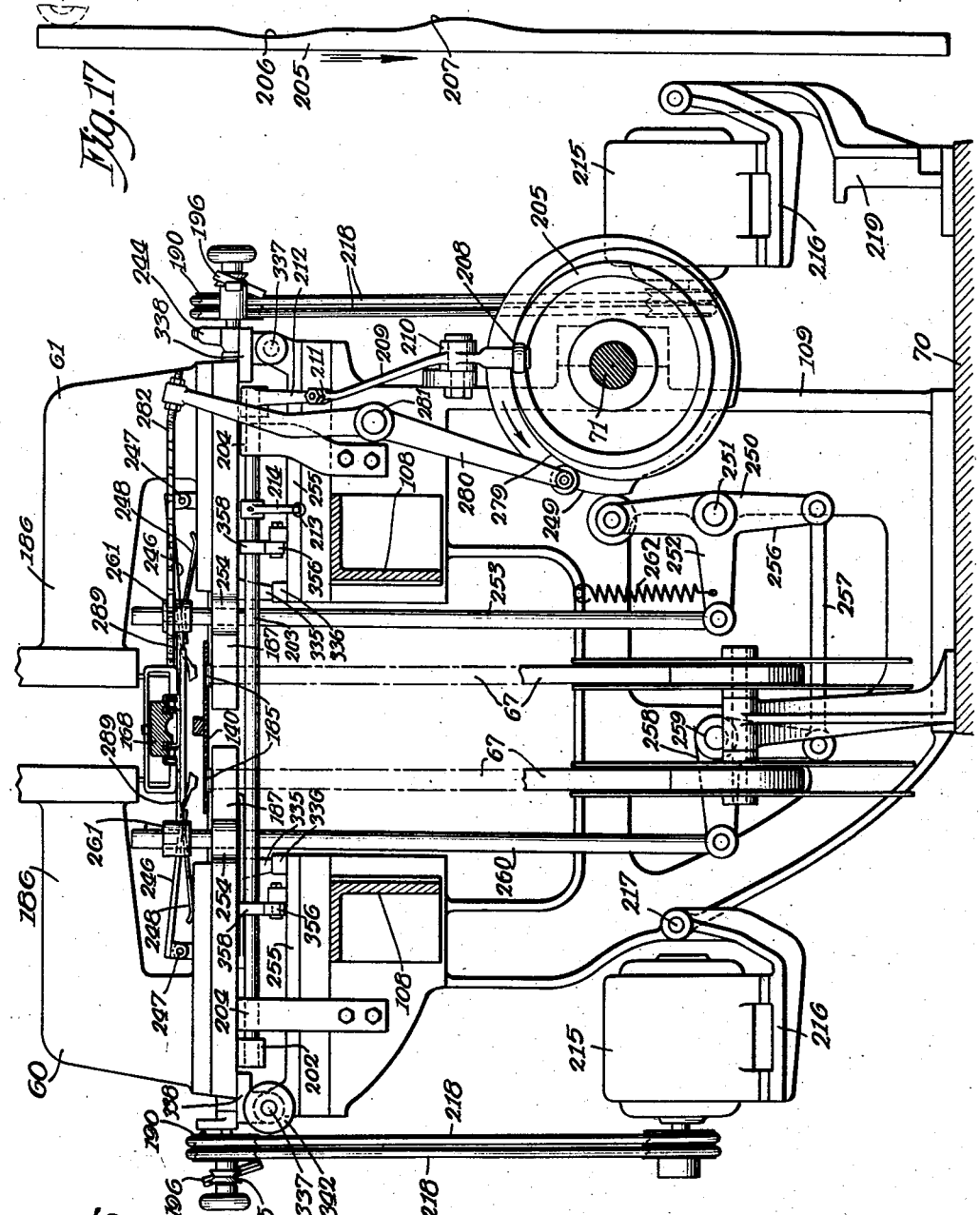

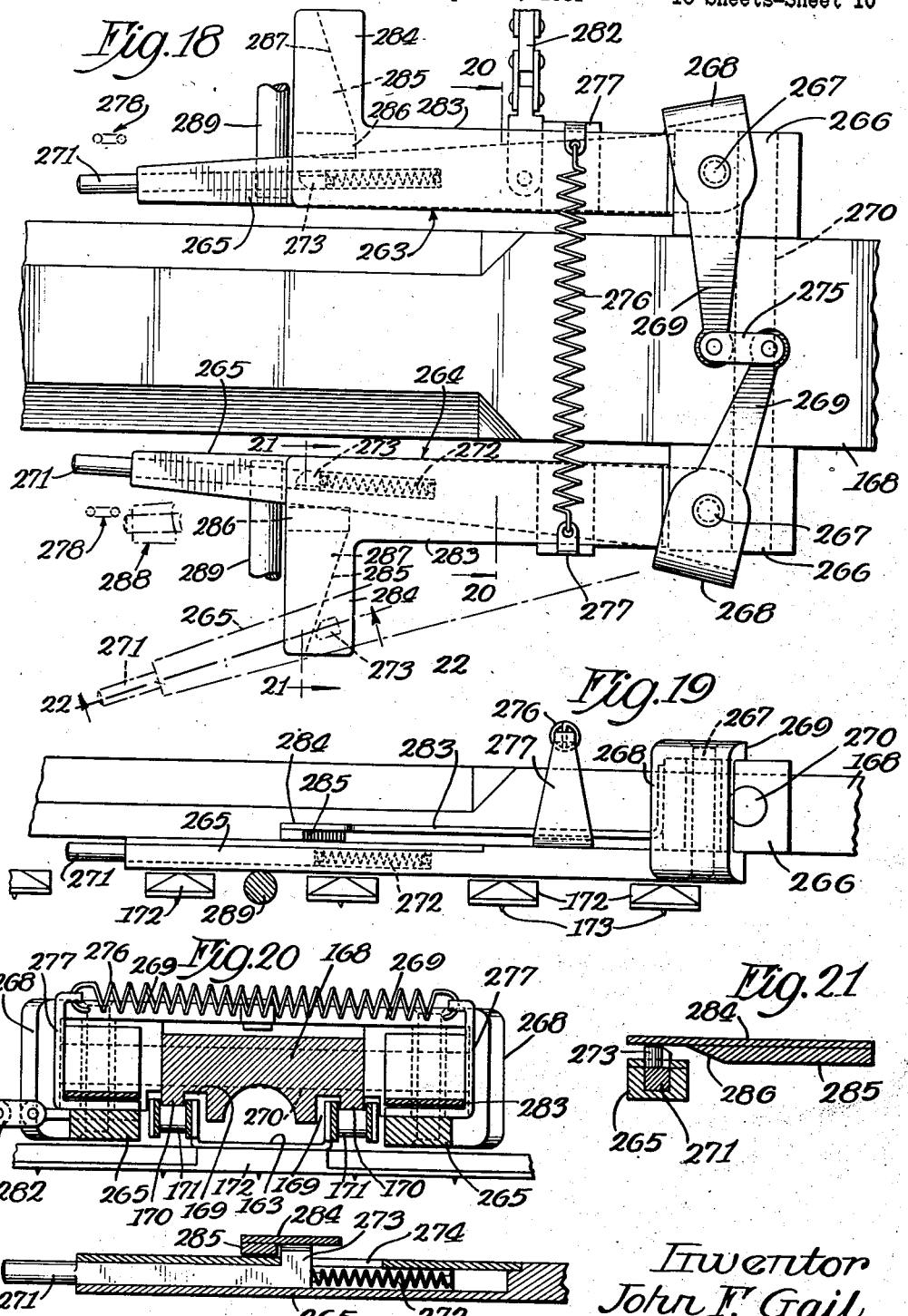

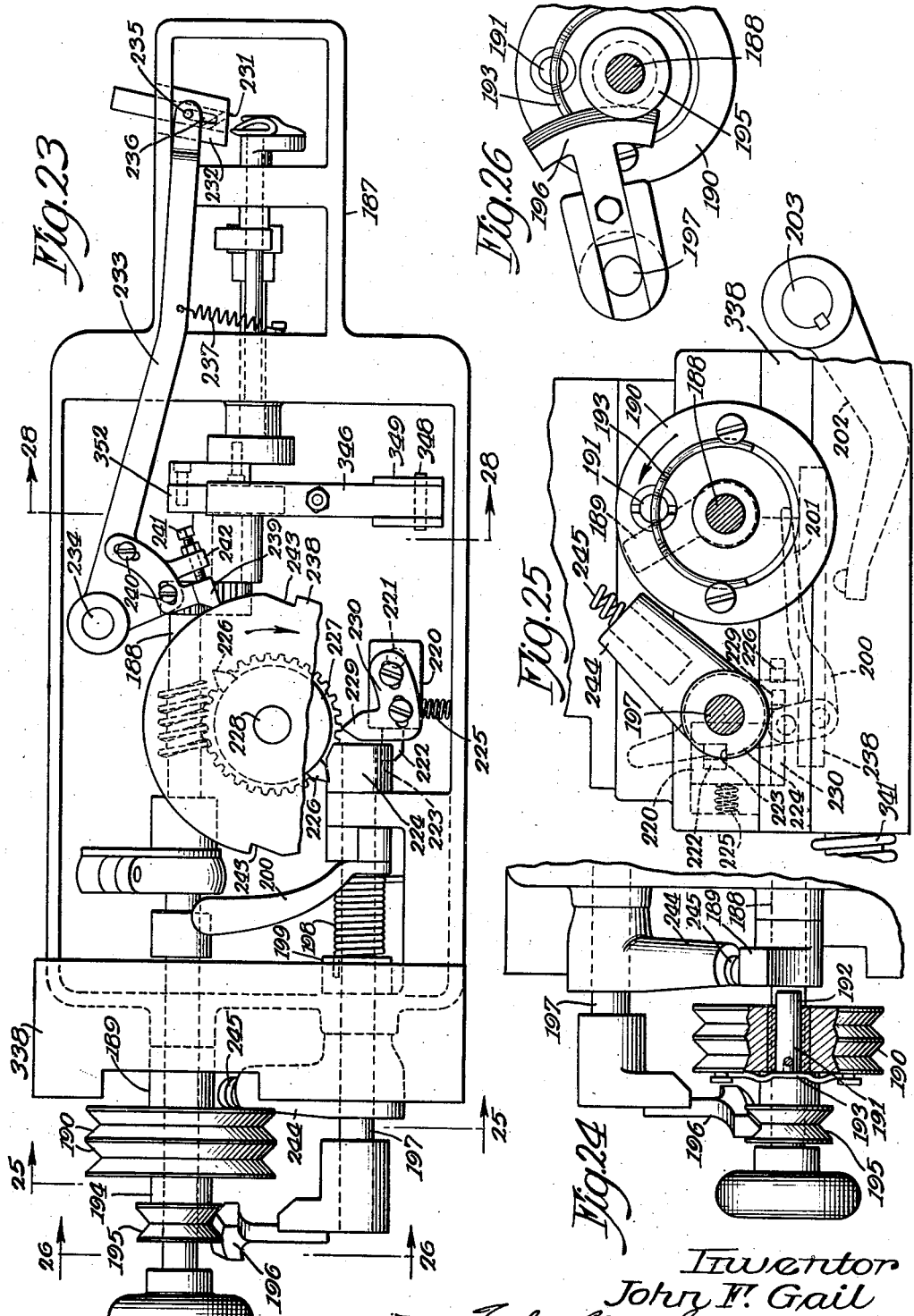

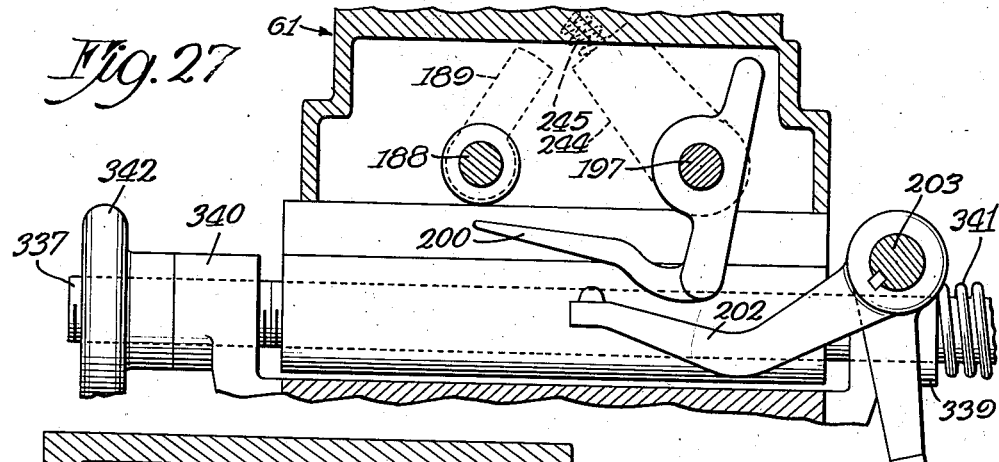
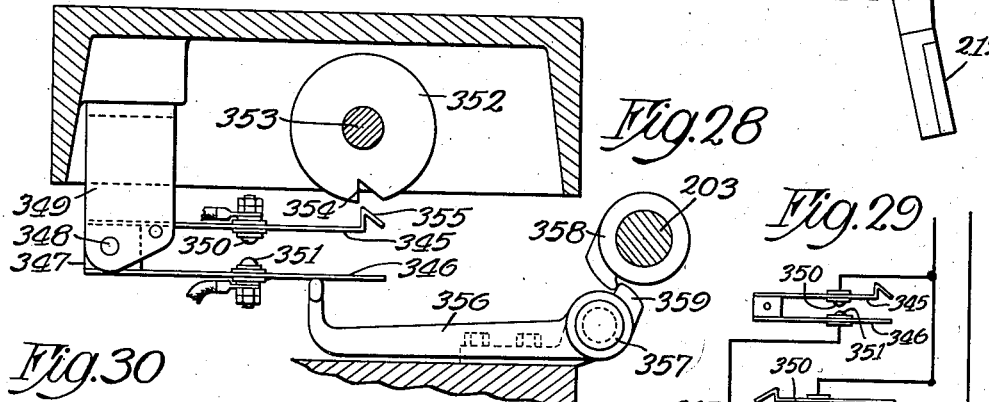
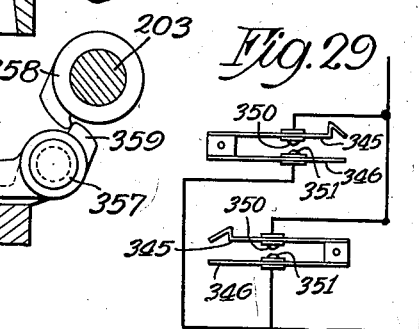

Dec. 1, 1936.  J. F. GAIL  2,062,359
METHOD OF AND APPARATUS FOR MAKING MATTRESS BOXING STRIPS
Filed Sept. 21, 1931   16 Sheets-Sheet 13
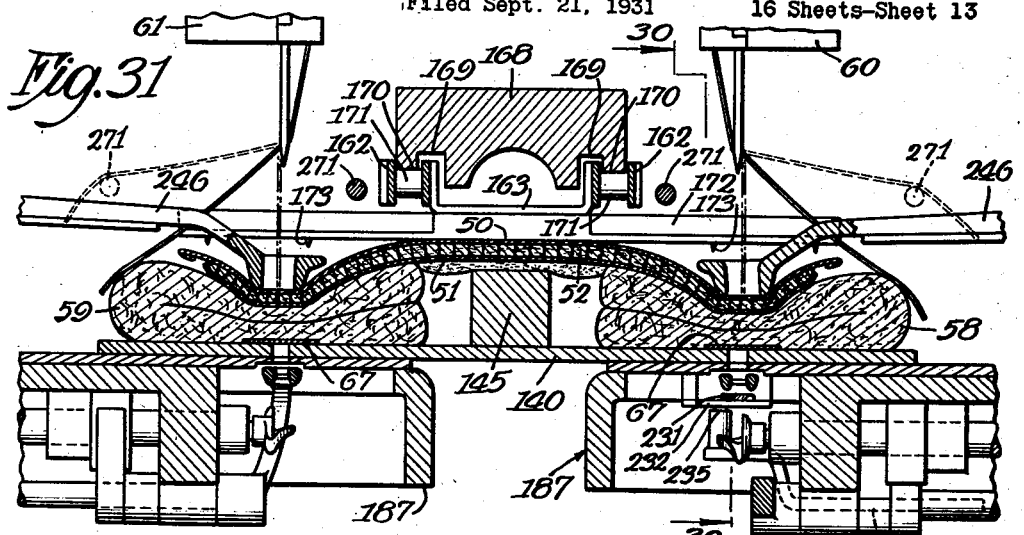
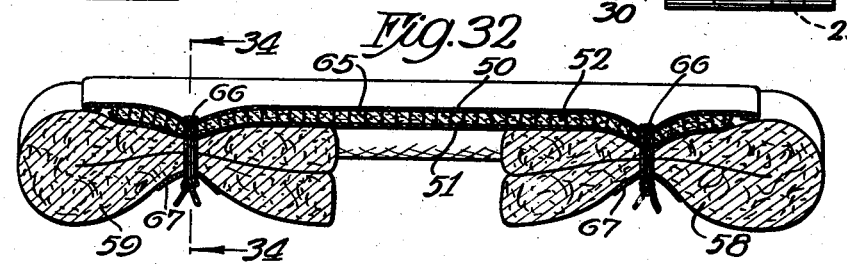
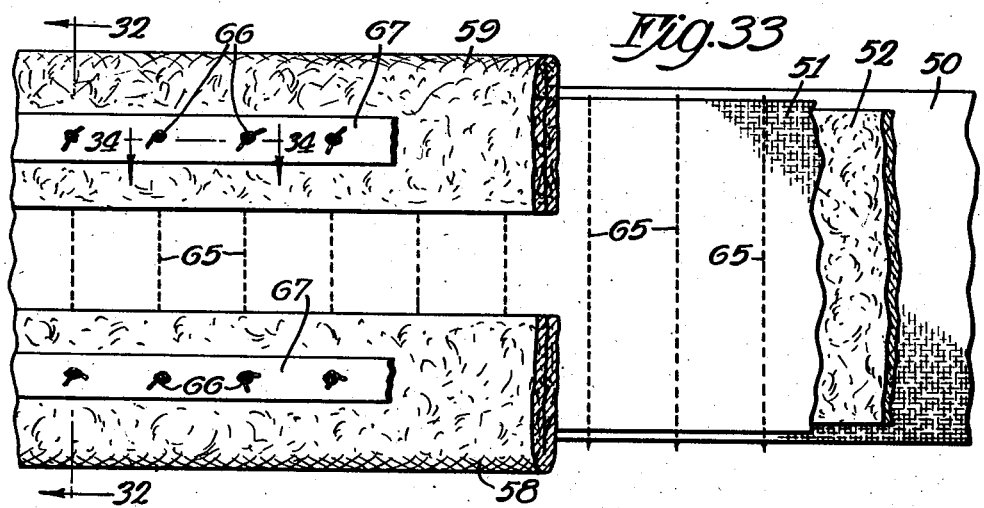
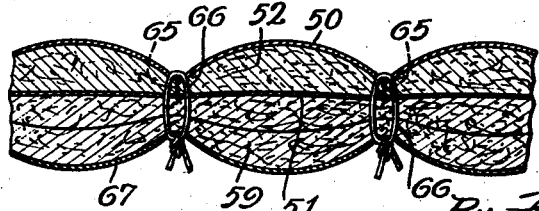
Inventor
John F. Gail
By Fisher, Clapp, Soans and Pond Dec. 1, 1936.  J. F. GAIL  2,062,359
METHOD OF AND APPARATUS FOR MAKING MATTRESS BOXING STRIPS
Filed Sept. 21, 1931  16 Sheets-Sheet 14
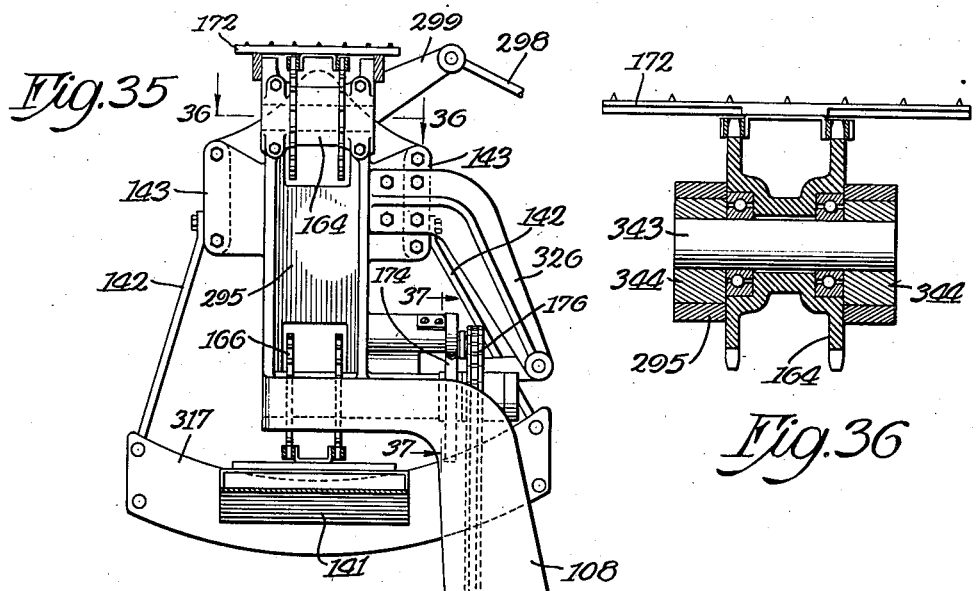
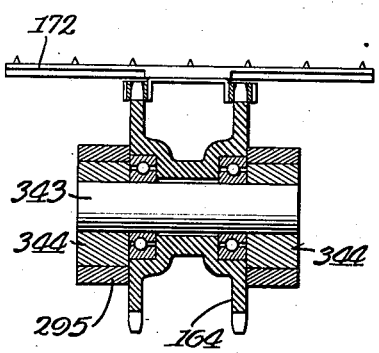
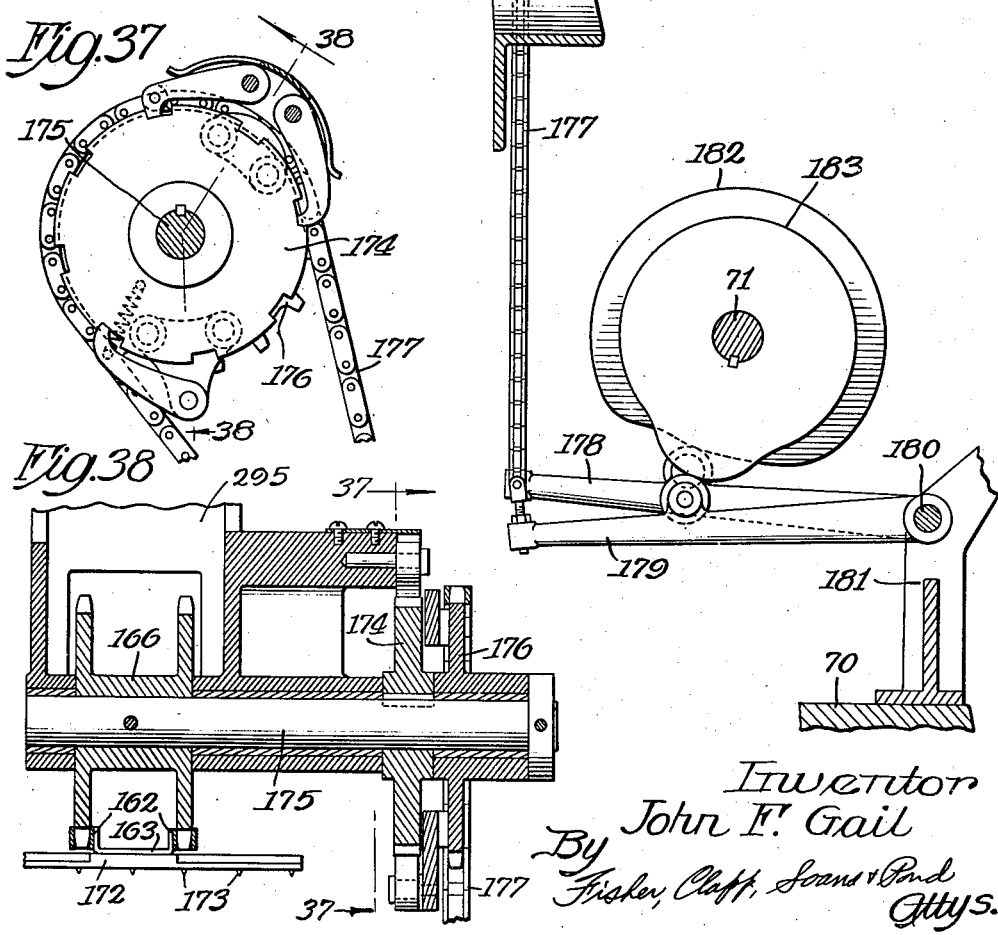
Inventor
John F. Gail
By Fisher, Clapp, Soans & Pond
Attys.

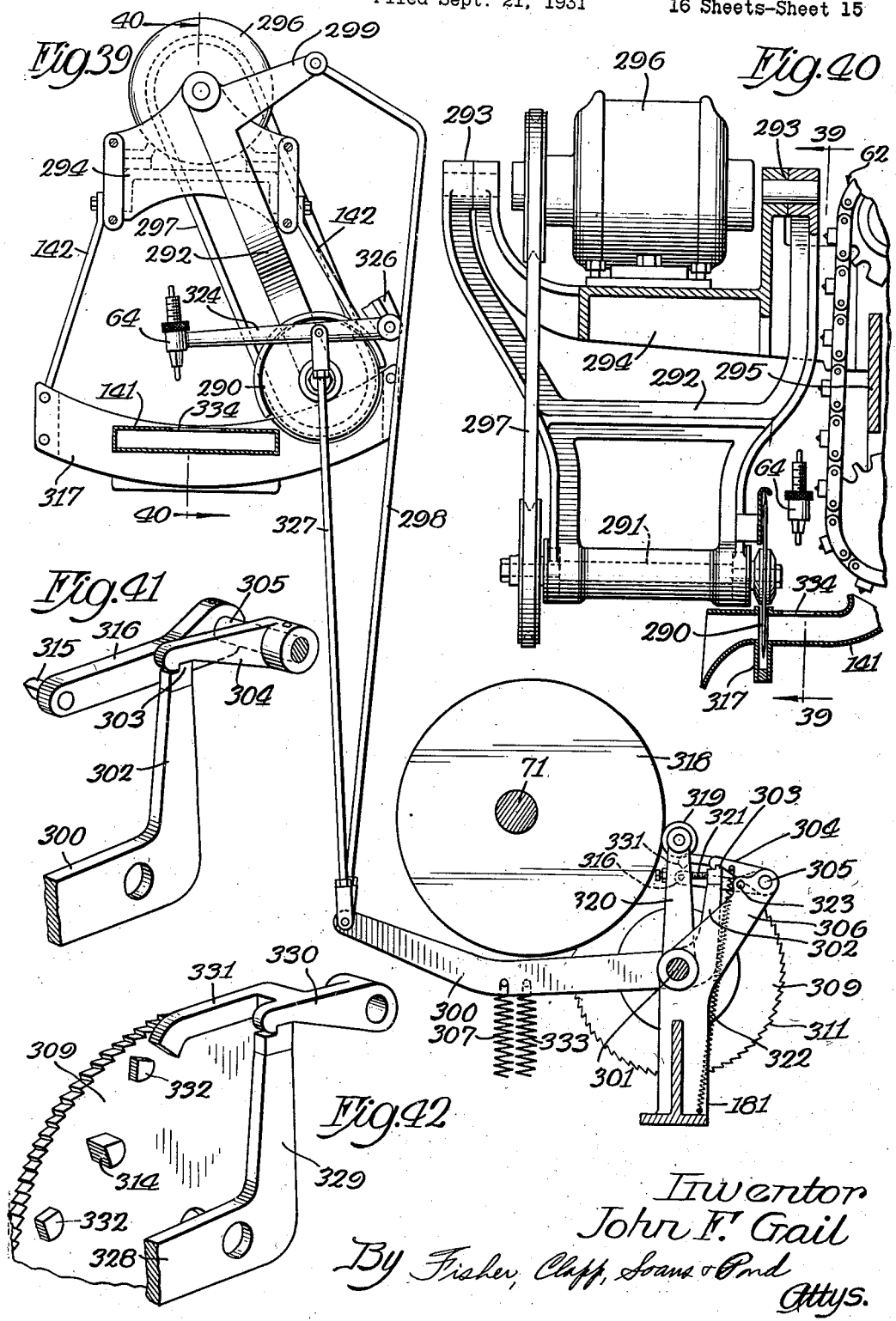

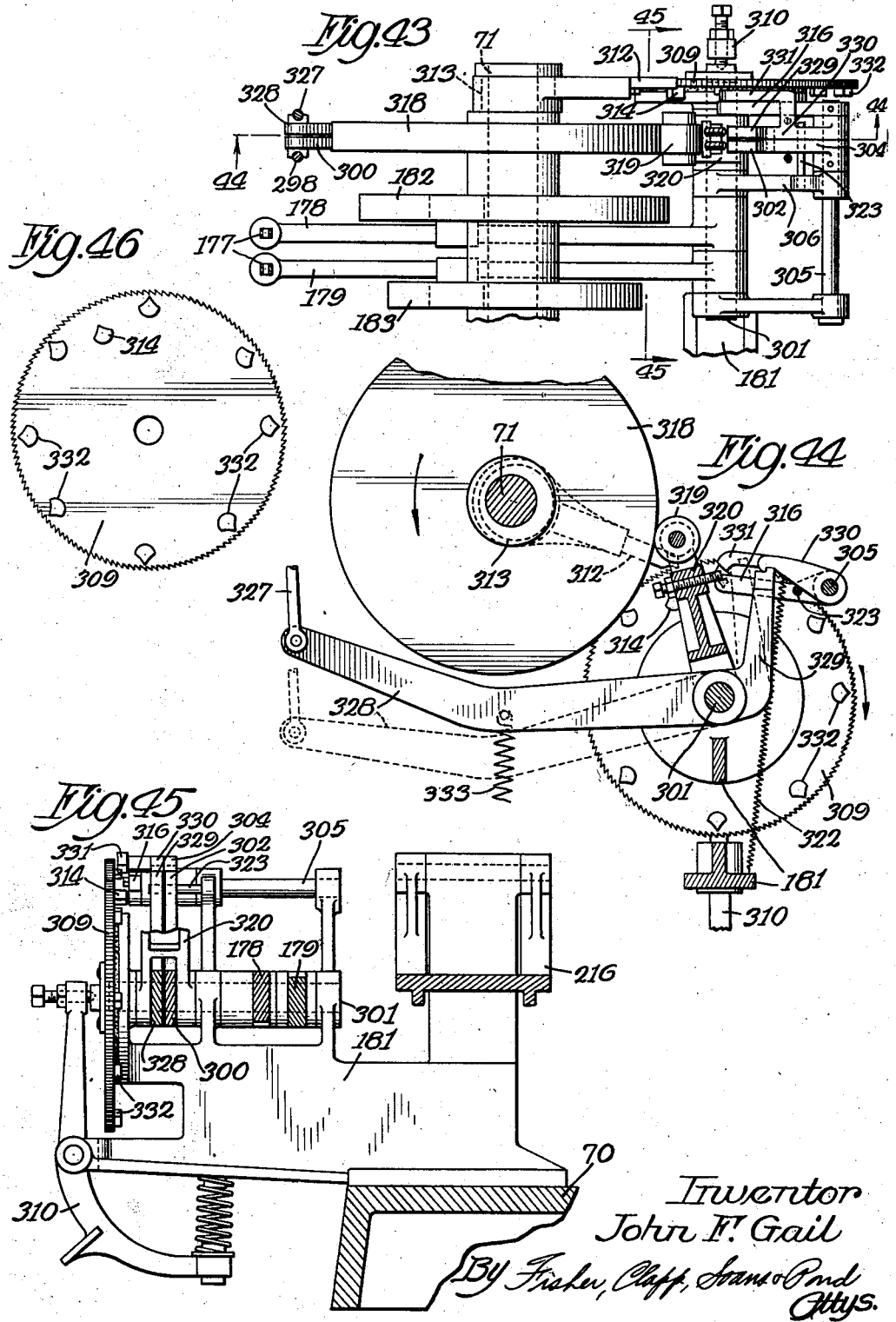

Patented Dec. 1, 1936

2,062,359

UNITED STATES PATENT OFFICE 2,062,359

METHOD OF AND APPARATUS FOR MAKING MATTRESS BOXING STRIPS

John F. Gail, Evanston, Ill., assignor to Simmons Company, New York, N. Y., a corporation of Delaware Application September 21, 1931, Serial No. 563,948

19 Claims. (Cl. 112—3)

This invention relates to an improved method and apparatus for making mattress boxing strips. The apparatus disclosed in this application is designed to co-operate with the mechanism disclosed in my co-pending application, Serial No. 307,450, for patent on quilting machine to make mattress boxing strips of the kind disclosed in my co-pending application Serial No. 428,560.

The main object of the present invention is to provide mechanism for automatically assembling and uniting the elements which form mattress boxing strips of the kind disclosed in my said co-pending application Serial No. 428,560.

Other objects of the invention are to provide mechanism for the purpose set forth, which will be entirely automatic in its operation and which will not require the constant attention of an operator; to provide means for uniting a quilted boxing-strip element with another padding strip at points which intersect or substantially register with points or lines of quilting in the quilted element; to provide sewing mechanism for so uniting a quilted member and another member; to provide an arrangement whereby the quilted member may be accurately registered with the sewing mechanism so as to effect the union of the members at said intersecting or registering points; to provide means for efficiently holding the work during the operation of the sewing machine; to provide improved means for severing the sewing thread on the bottom side of the work; to provide improved means for pulling the severed thread end upwardly through the work in preparation for a succeeding sewing operation; to provide automatic control-means for stopping operation of the thread-pulling and other mechanism in the event that the sewing machine fails to operate in its normal manner, and to provide improved means for starting the operation of the sewing mechanism.

Still other objects of the invention are to provide means for marking the boxing strip produced by the mechanism at predetermined points to indicate the proper location of certain devices, for instance, ventilators, in the length of a mattress boxing-strip; to provide means for cutting the boxing strip produced by the mechanism into predetermined lengths upon delivery of such predetermined lengths from the machine, and to provide readily changeable means for controlling the marking and cutting devices, whereby the points of marking and length of strip may be varied.

Further objects and advantages of the invention will be understood by reference to the following specification and accompanying drawings (sixteen sheets) in which a preferred form of the machine for making mattress border-strips is illustrated.

In the drawings:—

Fig. 2 is a side elevation of certain mechanism for feeding and preparing a padding strip which is to be assembled with the quilted boxing-strip produced by the mechanism of my said co-pending application, the latter mechanism being also shown in elevation in back of the padding-strip feeding and preparing mechanism referred to;

Fig. 3 is a plan of the padding-strip feeding and preparing mechanism shown in Fig. 2, the line 3—3 in Fig. 2 showing the location of the mechanism of Fig. 3;

Figure 2:
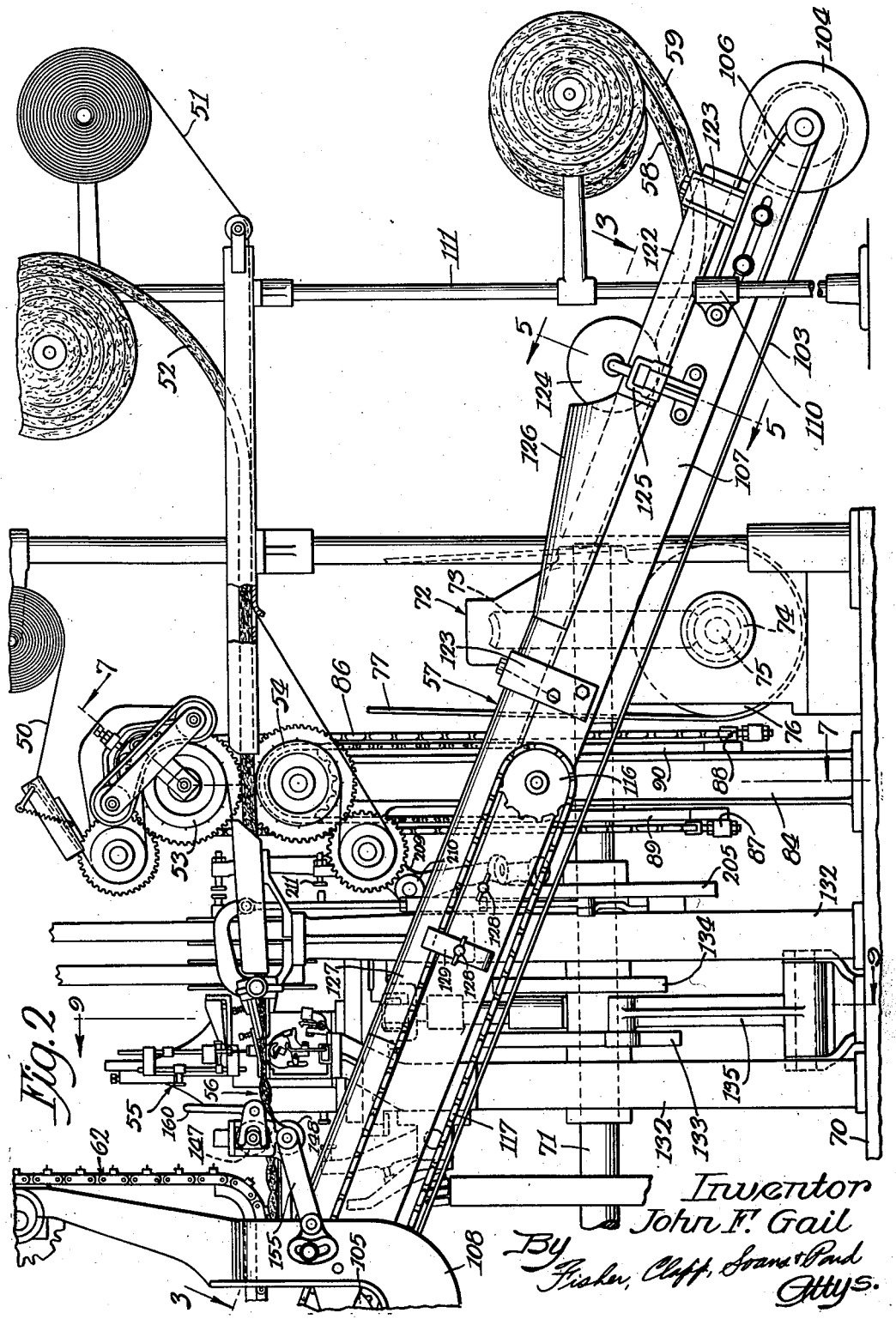

Figs. 4, 5, and 6 are sections on the lines 4—4, 5—5, and 6—6, respectively, of Fig. 3, the plan of the section of 5—5 being also shown by the line 5—5 of Fig. 2;

Fig. 7 is a section on the line 7—7 of Fig. 2;
Fig. 8 is a section on the line 8—8 of Fig. 7;
Fig. 9 is a section on the line 9—9 of Fig. 2;
Fig. 10 is a plan section on the line 10—10 of Fig. 1;

Fig. 11 is a section on the line 11—11 of Fig. 10;
Fig. 12 is a plan of a portion of a mattress boxing-strip produced by the mechanism;
Fig. 13 is a section on the line 13—13 of Fig. 11;
Fig. 14 is a section on the line 14—14 of Fig. 10;
Fig. 15 is a section on the line 15—15 of Fig. 13, the location of this section being similarly indicated on Fig. 10;

Fig. 16 is a section on the line 16—16 of Fig. 10, this section being similarly indicated on Fig. 11;

Fig. 17 is a development of a cam shown in Fig. 16;

Fig. 18 is an enlargement of a portion of the mechanism appearing in Fig. 10;

Fig. 19 is a side elevation of the parts shown in Fig. 18;

Figs. 20, 21, and 22 are sections on the lines 20—20, 21—21, and 22—22, respectively, of Fig. 18;

Fig. 23 is a bottom plan of a sewing machine constituting part of the mechanism;

Fig. 24 is a top plan of a portion of the sewing mechanism shown in Fig. 23;

Figs. 25 and 26 are sections on the lines 25—25 and 26—26, respectively, of Fig. 23;

Fig. 27 is a section on the line 27—27 of Fig. 10;

Fig. 28 is a section on the line 28—28 of Fig. 23;

Fig. 29 is a schematic view illustrating an electric control for the main drive of the mechanism;

Fig. 30 is a section on the line 30—30 of Fig. 10, the location of this section being similarly illustrated on Fig. 31;

Fig. 31 is a section on the line 31—31 of Fig. 10, the location of this section being also similarly illustrated on Fig. 30;

Fig. 32 is a cross-section through a boxing-material strip such as is produced by the machine involved in this application, the location of this section being indicated by the line 32—32 of Fig. 33;

Fig. 33 is a bottom plan of the boxing-strip shown in Fig. 32, the top plan thereof being shown in Fig. 12;

Fig. 34 is a section on the line 34—34 of Figs. 32 and 33.

Figure 1:
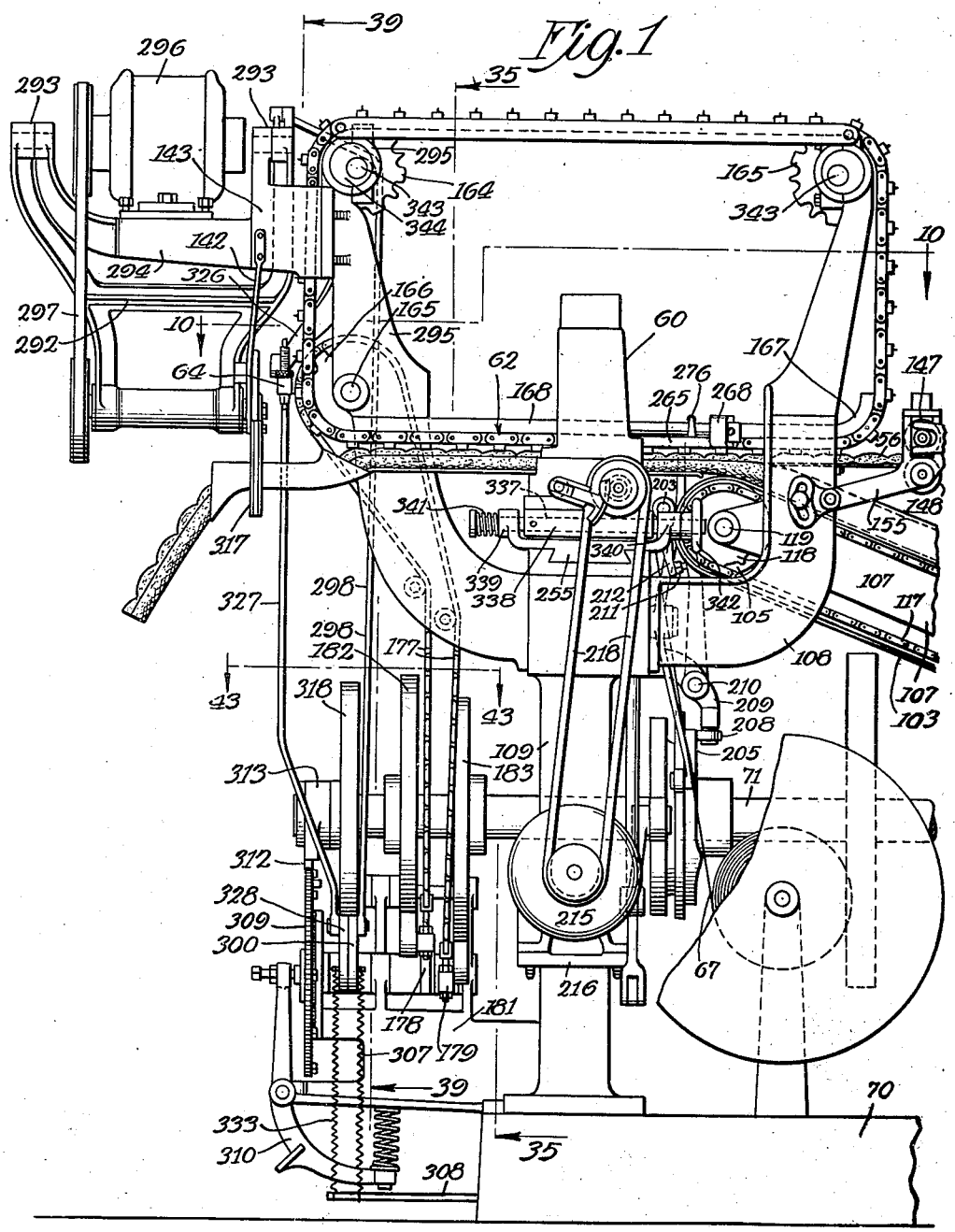
Fig. 1 is a side elevation of certain mechanisms which are connected with the mechanism shown in my co-pending application, Serial No. 307,450.

Fig. 35 is a section on the line 35—35 of Fig. 1;

Fig. 36 is a section on the line 36—36 of Fig. 35;

Fig. 37 is a section on the line 37—37 of Figs. 35 and 38;

Fig. 38 is a section on the line 38—38 of Fig. 37;

Fig. 39 is a section on the line 39—39 of Figs. 1 and 40;

Fig. 40 is a section on the line 40—40 of Fig. 39;

Figs. 41 and 42 are perspectives of certain details of mechanism constituting part of the machine;

Fig. 43 is a section on the line 43—43 of Fig. 1;

Figs. 44 and 45 are sections on the lines 44—44 and 45—45, respectively, of Fig. 43, and Fig. 46 is an elevation of a changeable device for controlling the marking and boxing-strip cutting mechanism, referred to in the object statements.

Referring now to the drawings, and more particularly to Figs. 1 and 2, I will proceed first with a brief description of the mechanism as a whole. As shown in Fig. 2, outer and inner strips of fabric, 50 and 51, and a strip of padding material 52 are suitably supported in supply rolls from which the strips are fed forward in relative interposed relation, the padding strip 52 being interposed between the fabric strips 50 and 51. The fabric strip 50 may be considered to be the outer strip and is preferably of suitable mattress ticking material. The superposed strips are advanced step by step between upper and lower feed rolls 53 and 54 and are suitably guided to stitching mechanism 55. The stitching mechanism 55 is moved transversely of the superposed strips to unite the same and the strips are fed by an intermittent or step-by-step movement. A quilted boxing strip member 56 is thus formed. The mechanism for feeding and uniting the strips 50, 51, and 52 is described in detail in my co-pending application, Serial No. 307,450, to which reference may be had for a full description thereof. However, for convenience in the present application, I will hereinafter describe the means for imparting step-by-step movement to the fabric strips and the padding strip and also the means for imparting transverse movement to the sewing machine.

Extending across the front of the quilting mechanism shown in Fig. 2, there is a conveyor 57 which receives a pair of padding strips 58 and 59, respectively, to feed the same into assembled relation with the quilted boxing-strip member 56. The conveyor 57 includes devices for folding the strips 58 and 59 longitudinally upon themselves and it operates to feed the folded strips into assembled relation with the quilted boxing strip 56, the folded padding strips being respectively located under the marginal portions of the quilted boxing strip 56.

Sewing mechanisms, in this instance, two in number and preferably of the button-attaching type, are provided for uniting the folded padding strips to the quilted boxing strip. One of the said sewing mechanisms is shown at 60 in Fig. 1 and the other is indicated at 61 in Figs. 10 and 16. The sewing mechanisms 60 and 61 serve to tack the folded padding strips 58 and 59 to the quilted boxing strip 56. The assembled and united quilted strip 56 and folded padding strips 58 and 59 are fed forward by a step-by-step movement through the agency of an endless conveyor 62. At predetermined intervals, a cutter is actuated to sever a predetermined length of the completed boxing strip from the strip being produced by the mechanism. A marking device 64 is actuated at predetermined intervals to mark the boxing strip to indicate the proper location of ventilating devices which are to be incorporated in the boxing strip after the same is delivered from the mechanism herein concerned.

The structure of the boxing strip produced by the machine herein disclosed is illustrated in Figs. 32, 33, and 34. By reference to said figures, it will be seen that the outer and inner fabric strips 50 and 51 and interposed padding strip 52 are united or quilted by means of longitudinally spaced, transversely extending lines of stitching 65, and that the folded padding strips 58 and 59 are secured to the quilted strip by means of tacking stitches 66, which intersect or substantially register with the respective lines of quilting 65. As clearly shown in Figs. 32, 33, and 34, a reinforcing tape strip 67 is positioned against the inside of the respective folded padding strips so as to effectively anchor the tacking stitches 66 in the folded padding strips. The reinforcing tapes 67 are supplied from supply rolls such as shown in Fig. 1, and are guided upwardly to a position under the assembled elements so as to be in proper place to be penetrated by the tacking stitches which are produced by the sewing machines 60 and 61.

*Detailed description*

The mechanism illustrated in Figs. 1 and 2 is mounted on a base member 70 and suitable main frame elements which are mounted on the said base. A main driving shaft or cam shaft 71 is rotatably supported in suitable bearings formed in certain of the main frame members, this shaft being continuously rotated by means of a worm or worm-wheel driving mechanism 72. The worm-wheel 73 of said driving mechanism is fixedly mounted on the shaft 71 and the worm 74 of said driving mechanism is carried by a shaft 75 which is driven through the agency of a pulley 76 and driving belt 77. The belt 77 receives its driving movement from a main power shaft 78 (see Fig. 29), on which is mounted a pulley 80 for driving the belt. Rotation of the pulley is controlled by suitable clutch mechanism 81, which may be manually controlled by means of a hand-lever 82 and which is automatically controlled for a purpose and by mechanism which will be presently explained.

Referring now to Figs. 7 and 8, step-by-step rotation is imparted to the feed rolls 53 and 54 of the quilting mechanism by pawl and ratchet mechanism and cam-actuating mechanism. The feed roller 53 is rotatably mounted on a shaft 83 which is fixedly mounted in a suitable boss in the main frame element 84. A sprocket member 85 is also rotatably mounted on the shaft 83 and is engaged by a chain 86, the ends of which are secured to a pair of actuated levers 87 and 88, respectively. The levers 87 and 88 are controlled by cams 89 and 90, respectively, as clearly shown in Fig. 7, these cams being so shaped as to impart downward movement to one of the levers while permitting corresponding upward movement of the other lever. This mechanism is operative to oscillate the sprocket 85 on the shaft 83. A gear 91 and a peripherally notched driving disk 92 are secured to the feed roll 53. The peripherally notched driving disk 92 is acted upon by a pawl 93 which is carried by a bracket 94 secured to the sprocket 85. A pair of pawls 95 and 96 which are pivotally mounted on an extension 97 of the main frame 84 engage the notches of the driving disk 92 to hold the disk against accidental rotation, a flat spring 98 being provided for normally holding the pawls 95 and 96 in operative engagement with the driving disk 92. The sprocket 85 is provided with a cam lug 99 which acts upon a roller carried by the pawl 95 to hold the same out of one of the notches of the driving disk 92 when the sprocket is rotated in driving direction, as indicated by the arrow 100 in Fig. 8. It will be understood that the pawl 95 is raised out of the notch in the driving disk upon the rearward movement of the sprocket 85 and that it is temporarily held out of engagement therewith until the disk has been moved a sufficient distance to prevent return of the pawl into the same notch. The pawls 93 and 96 are automatically displaced from one of the notches by reason of their curved cam surfaces 101 which are engaged by the engaged shoulder formed by the notch. The pawl 93 serves to prevent rearward movement of the driving disk and feed roller when the sprocket 85 is rotated rearwardly in preparation for a succeeding feeding movement.

The lower feed roll 54 is rotated simultaneously with rotation of the upper feed roll 53 by means of a gear 102 which is carried by the lower feed roll and which meshes with the gear 91 of the upper feed roll.

The padding-strip conveyor 57 is preferably of the endless belt type and includes an endless belt 103 which passes around pulleys 104 and 105, the pulley 104 being rotatably mounted in suitable brackets, such as 106, which are longitudinally adjustably mounted on the support or framework 107 of the conveyor. As shown in Figures 4, 5, and 6, the supporting frame-work consists mainly of a pair of horizontally spaced, inwardly facing, channel iron members which are suitably secured together. The pulley 105 is rotatably mounted in suitable brackets carried by the arms 108 which are secured to and carried by a main frame member 109. As shown in Figures 1 and 2, the main frame 107 of the conveyor is secured at its upper end to the arm portion 108 and at its lower end, by means of brackets such as shown at 110, to a supporting post 111.

The conveyor belt 103 is advanced in a step-by-step movement by means of a driving connection with the lower feed roll 54. As shown in Figures 2, 7, and 8, a sprocket 112 is secured to the lower feed roll 54, and an endless chain 113 extends around the sprocket 112 and around another sprocket 114 which is secured to a shaft 115, rotatably mounted in suitable bearings provided in the conveyor frame 107. At the front end of the shaft 115, there is provided a sprocket 116 and an endless chain 117 extends around the said sprocket 116 and around a sprocket 118 which is secured to the shaft 119 which carries the upper conveyor roll 105. Thus, it will be seen that the conveyor belt 103 is advanced step by step simultaneously with the feed movements of the rolls 53 and 54.

The conveyor belt 103 is adapted to receive and propel in substantially co-planar but transversely spaced relation to each other, the padding strips 58 and 59 which are drawn from supply rolls suitably supported by a bracket on the post 111. By reference to Fig. 4 it will be seen that the padding strips 58 and 59 are comparatively wide but thin webs of material, approximately one-half of the width of which overlie the conveyor belt 103, the outer halves of the respective strips being supported by suitable supports or shelves 120 which are provided with upwardly extending sides 121 which constitute outer guides for the padding strips. A tubular guide member 122 serves to maintain the padding strips in spaced relation on the conveyor.

The tubular guide 122 is supported adjacent its opposite ends by suitable brackets, as indicated at 123, which may be formed independently or as parts of other elements which are supported by the frame 107 of the conveyor.

Near the receiving end of the conveyor 103, there is provided a pair of tapered creasing rolls 124—124 which are rotatably mounted on suitable brackets 125—125 which are pivotally carried as shown in Fig. 5 by suitable brackets mounted on the conveyor frame 107. The padding strips 58 and 59 are fed beneath the respective rolls 124 as shown in Fig. 5 and are independently more or less creased longitudinally approximately midway between their side edges. A funnel-like folding device 126 is provided for each of the padding strips 58 and 59 immediately in back of the respective rolls 124—124. These folding devices serve to fold the outer portion of the respective padding strips over upon their respective inner portions, so that the padding strips assume the doubled or folded condition illustrated in Fig. 6. It will, of course, be understood that the folding action of the folding devices 126 is incidental to the feed movement of the padding strips through the said folding devices.

It is desired to deliver the padding strips 58 and 59 in the folded condition just described to a position beneath the respective marginal portions of the quilted boxing-strip 56, and in order to maintain the padding strips 58 and 59 in such folded condition, retainers 127—127 are provided (see Fig. 6). The retainers 127—127 are preferably hingedly connected to supporting members which are secured to the conveyor frame 107, as clearly shown in Fig. 6, and releasable means are provided for holding the retainers 127—127 in operative position as illustrated. The releasable holding means for each conveyor is designated at 128 and each includes a rod which is slidably mounted in the conveyor frame and provided at one end with a bracket such as 129, which is secured intermediate its ends to the rod with which it is associated and provided with ends respectively engaging the retaining member 127 and frame 107 of the conveyor. A spring 130 disposed around the rod 128 and compressed between a collar, such as 131, and the adjacent frame member, serves to normally and yieldingly hold the bracket member 129 in position to maintain the retaining member 127 in operative position. It will, of course, be understood that the respective rods 128 are urged in opposite directions so as to be operative to hold the respective retainers 127—127 in said operative position. When it is desired to gain access to the path of travel of one of the folded padding strips 58 or 59, the proper holding rod 128 is moved against the pressure of the spring 130 to release the bracket 129 from its operative holding position, whereupon the retaining member 127 may be folded back out of the way. Thus, access may be had to the conveyor belt 103 which is supported intermediate its end rolls by means of a supporting plate 131 which extends across the space between the supporting frame members 107. As shown in Fig. 2, the spacing tube 122 terminates a short distance beyond the end of the folders 126, but it will be understood that if desired, this spacing member may be continued for substantially the full length of the conveyor for preventing the folded padding strips from working towards each other and out from under the fold retainers 127—127.

The relation of the conveyor 57 to the quilting machine mechanism is shown in Fig. 9 wherein the sewing machine 55 and the means for moving the same transversely across the assembled strips 50, 51 and 52 are shown. As indicated, the sewing machine head 55 is mounted for sliding movement in ways carried by the main frame member 132. Transverse sliding movement of the sewing machine head is effected by means of suitable cams 133 and 134, carried by the cam shaft 71 and acting upon rollers carried by a pivoted cam follower 135, the upper end of which is connected by means of a link 136 to a lever 137. The lever 137 is pivoted at its lower end to a bracket carried by the base 70, and the upper end of the lever is connected by means of a link 138 to the sewing machine, so that rocking movement of the lever 137 effects transverse reciprocation of the sewing machine 55.

*The mechanism for uniting the folded padding strips to the quilted boxing member*

Referring now particularly to Figs. 10, 11 and 16, it will be seen that there is a supporting plate 140 which extends longitudinally of the mechanism. The plate 140 is supported adjacent one end by being seated on the bed plate portions of the sewing machines 60 and 61, as clearly shown in Figs. 16 and 31. Adjacent its delivery end (the left-hand end in Fig. 11), the plate 140 is provided with a tubular discharge portion 141, which is integrally formed or otherwise rigidly connected to the plate 140, the said discharge end being supported by means of rods 142—142 which extend upwardly from the said discharge end to a supporting frame portion 143, as clearly shown in Figures 1 and 35. A receiving plate 144 is disposed in longitudinally spaced relation to the receiving end (right-hand end in Fig. 11) of the plate 140, the said plate 144 being supported by means of a longitudinally extending bar 145 which is centrally disposed and secured to the plate 140. The receiving plate 144 is also supported by a transversely extending tie rod 146 which extends between and connects the front and rear side brackets 108 of the main frame 109 (see Fig. 13).

The quilting strip which is produced by the mechanism shown in Fig. 2 is passed between upper and lower feed rolls 147 and 148, respectively, which serve to guide and assist the feeding movement of the quilted strip to the receiving support 144.

The feed rolls 147 and 148 are geared together by means of intermeshing gears 149 and 150, as clearly shown in Fig. 15, so that these rollers are simultaneously rotated in opposite directions. Step-by-step feed movement is imparted to these rollers to correspond to the step-by-step movement of the quilted boxing-strip as produced in the quilting mechanism and to conform to the step-by-step movement of the folded padding strip on the conveyor 57. Such step-by-step movement is imparted to the rollers 147 and 148 by means of a chain driving connection with the conveyor pulley 105, as is clearly shown in Fig. 14. This chain driving connection includes a sprocket wheel 119' secured to the conveyor shaft 119, a sprocket wheel 150' secured to the shaft of the lower feed roller 148, and an endless chain 151 which extends around said sprockets 119' and 150'. An idler sprocket 152 is rotatably mounted on a suitable stud carried by the frame arm 108 and serves to guide the upper reach of the chain 151 through a path of travel below the tie rod 146. Another sprocket 153 is rotatably mounted on a shaft or stud carried by a bracket 154 which is adjustably mounted on the frame 107 of the conveyor 57. The sprocket 153 constitutes a slack take-up for the chain 151, it being obvious that such function is permitted by reason of the adjustable mounting of the supporting bracket 154. The need for such a take-up is found particularly for the reason that the feed rolls 147 and 148 are mounted in bearings carried by arms 155—155 which are pivotally mounted on the adjacent side-frame members 108, as indicated at 156. The arms 155—155 are normally locked in the desired position of adjustment by means of clamping screws 157, as will be readily understood by examination of Fig. 14.

As clearly shown in Fig. 15, the lower feed roll is rotatably mounted in fixed bearings in the respective arms 155 while the upper feed roll is vertically adjustably mounted in bearing boxes 158 which are vertically adjustably supported in guides constituting an integral part of the respective arms 155. Springs, such as shown at 159, interposed between the respective bearing boxes 158 and overlying portion or cap of the guides, serve to normally yieldingly urge the roller 147 toward the roller 148. The roller 148 is provided with a central portion of reduced diameter as clearly shown in Fig. 15, to receive the padded portion of the quilting strip while the projecting hemmed edge portions of the outer fabric strip 50 of the quilted member pass between the enlarged end portions of the lower feed roll 148 and the upper feed roll 147. By reason of the clamping effect of the rolls 147 and 148 on the projecting hemmed edge portions of the outer fabric member just referred to, the rolls 147 and 148 are highly effective to impart advancing movement to the quilted boxing member. For facilitating the initial introduction of the quilted boxing member between the rolls 147 and 148, a bail member 160 having forked end members 161 co-operating with projecting portions of the bearing boxes 158 is provided. Obviously by swinging the bail 160 in the proper direction, the upper roll 147 will be raised against the compression of the spring 159 to space the upper and lower feed rolls apart, so that the quilted boxing strip may be readily interposed.

The quilted boxing strip issuing from the feed rolls 147 and 148 is received on the receiving plate 144 which supports the quilted strip in proper relation to the intermittently actuated conveyor 62 to permit the latter to engage the strip for the purpose of continuing its step-by-step feeding movement.

By reference to Figures 10, 11, and 31, it will be seen that the conveyor 62 includes a pair of endless chains 162—162 which are connected together in transversely spaced relation by U-shaped links 163. The chains 162—162 are guided around suitably formed upper sprockets 164 and 165 which are preferably in the form of double sprockets, to receive the connected chains 162—162 (see Figures 35 and 36). As shown in Figure 1, the conveyor chains 162—162 travel through a substantially rectangular path. The upper corners of the rectangular path are determined by the sprockets 164 and 165 and one of the lower corners is determined by a similar double sprocket 166. The opposite lower corner is determined by a rounded end portion 167 of a chain-guiding member 168 which extends longitudinally of the machine, substantially the entire length of the lower reach of the chain. The guide bar 168 is provided with grooves 169—169 (see Fig. 31) to receive portions of the chain and to provide tracks 170—170 along which the pins or rollers 171—171 of the chain may travel. Secured to each of the links 163 are work-engaging bars 172 which are preferably provided with sharply pointed work grippers 173.

Step-by-step movement is imparted to the conveyor 62, i. e., the chains 162—162, by means of a driving disk 174 which is keyed to the shaft 175 which carries the lower sprocket 166 (see Figs. 37 and 38). Associated with the driving disk 174 is a sprocket 176 which is rotatably mounted on the shaft 175. The sprocket 176 is oscillated by means of a chain 177 which extends around the sprocket and has its opposite ends connected to levers 178 and 179, respectively, each of which is pivoted at 180 on a conveniently located frame portion 181. Cams 182 and 183 carried by the main cam shaft 71 serve to impart oppositely directed movements to the levers 178 and 179 to thereby oscillate the sprocket 176. The sprocket 176 is provided with driving and locking pawls of substantially the same kind as those described in connection with Figs. 7 and 8 of the drawings, whereby step-by-step rotation in one direction is imparted to the driving disk 174 and consequently to the conveyor chains 162—162.

By reference to Fig. 11, it will be seen that the delivery end of the conveyor 57 is arranged to deliver the folded padding strip to the supporting plate 140 beneath the quilted boxing-strip as the latter passes off the receiving plate 144. The receiving end of the supporting plate 140 is preferably rounded downwardly as indicated at 184 to facilitate passage of the padding strips over the receiving edge of the plate and the relation of the conveyor gripping members 172 to the supporting plate 140 is such that the folded padding strips are compressed a considerable amount so that the frictional engagement between the quilted boxing strip and the folded padding strip is sufficient to insure unitary advance movements of the assembled parts.

The tape strips 67—67 are drawn from supply rolls, such as shown in Figures 1 and 16, and are fed into position beneath the folded padding strip on the supporting plate 140 through slots such as indicated at 185—185 (see Figures 11 and 16).

During intervals of rest in the feed movement of the assembled boxing strip elements, the tacking machines 60 and 61 are operated to unite the parts in the manner shown in Figures 32, 33, and 34. It will be apparent that the tape strips will be advanced in unison with the quilted boxing strip member and padding strip, first, because of the frictional engagement between the tape strip and the padding strip, and, second, because of the stitch ties in the assembled parts already passed through the sewing machines.

The tacking machines, as previously stated, are preferably a commercial form of button-sewing or attaching machine, but modified in certain respects to increase their utility for the present purpose.

Each stitching machine includes an upper arm 186 and a lower arm 187. The upper arm 186 serves to support vertically reciprocating and horizontally jogging needle mechanism while the lower arm supports mechanism for co-operating with the needle carried by the needle bar to knot the thread below the work in the manner usually practiced in button-attaching machines. Inasmuch as no invention is claimed in the mechanism for reciprocating and jogging the needle bar and needle or for controlling the lower co-operating mechanism, a detailed description thereof need not be given. However, for the purpose of facilitating description of means for automatically starting the operation of the sewing machine, certain of the operating elements will now be described. By reference to Figs. 23, 24, 25, and 26, it will be seen that in the lower arm of the sewing machine there is a main drive shaft 188 which has suitable connections to the various parts of the sewing instrumentalities. At the outer end of the drive shaft 188, there is mounted an arm or lever-like member 189, this member being pinned or keyed to the shaft 188 to rotate therewith. A double driving pulley 190 is freely rotatably mounted on the shaft 188 and is provided with a transversely extending plunger or pin 191. The plunger or pin, as shown in Figure 24, is of such length that it projects inwardly, as shown at 192, from the inside face of the double pulley and is adapted, when the pulley 190 is moved toward the arm 189, to engage behind the latter arm as indicated in Fig. 25, whereby rotation of the pulley is imparted to the arm 189 and shaft 188. The pin 191 is preferably held in the projecting position shown in Fig. 24 by means of an outwardly yieldable spring 193 which will permit the pin 191 to move outwardly in the event that the front end of the pin engages the face of the arm 189 instead of engaging the back side thereof.

The double pulley 190 is carried by a sleeve 194 which has secured to its outer end a collar 195 provided with a V-shaped groove, as shown in Figs. 23 and 24. An angularly disposed or pitched finger 196, carried by a rock shaft 197, co-operates with the grooved collar 195 in such a way that when the rock shaft is rocked in the proper direction, the collar 195, sleeve 194 and pulley 190 will be slid inwardly along the shaft 188 to effect engagement of the driving pin 192 with the back side of the arm 189. Rocking movement of the shaft 197 in the reverse direction will, of course, disengage the driving parts.

The rock shaft 197 is mounted in suitable bearings provided in the bottom arm of the sewing machine and is normally urged to rock in the proper direction for disengaging the driving means just described, by means of a coil spring 198 which is disposed around the rock shaft with one end anchored in a collar 199 carried by the rock shaft and the other end anchored to a part of the lower arm of the sewing machine head. It will be understood that the spring 198 is so anchored that it cannot be rotated around the shaft 197 and so that rocking movement of the shaft in one direction winds the spring so that it will have a tendency to unwind itself and correspondingly rock the shaft 197 in the reverse direction. Also secured to the shaft 197 is an arm 200, this arm having a more or less flattened free end portion 201 which is adapted to be engaged by the free end of an arm 202, carried by a rock shaft 203.

The rock shaft 203 is mounted for oscillation in suitable bearings 204—204 (Fig. 16) supported by the frame member 109, and it is adapted to be rocked by means of a rotary cam 205 which is carried by the cam shaft 71. The cam 205 is preferably in the form of a cylinder, the end of which is provided with a suitably formed depression such as indicated at 206 and a suitably formed hump such as indicated at 207 in Fig. 17. This cam acts against a cam follower 208 carried by the lower end of a lever 209 which is pivoted intermediate its ends as indicated at 210 on a conveniently located portion of the frame 109 or bracket secured thereto. The upper end of the arm or lever 209 is provided with an adjustable striker 211 which is adapted to engage the free end of an arm 212 which is secured to the rock shaft 203 (see Figs. 1, 11, and 16).

The cam follower 208 is maintained in operative engagement with the cam 205 by means of a spring 213 which is stretched between the free end of an arm 214 which is secured to the rock shaft 203 and a portion of the supporting frame 109 (see Fig. 10).

Rotation of the cam 205 is effective, through the rock arm 209 and arm 212, to rock the shaft 203 against the tension of the spring 213 and thereby rock the arm or lever 202 in an upward direction to thereby engage the free end portion 201 of the lever 200 (see Fig. 25), whereby the rock shaft 197 of the sewing machine is rocked in the proper direction to start the sewing mechanism.

The sewing machine is driven by means of an electric motor 215 which is supported on a shelf 216, the latter being pivotally mounted, as indicated at 217, on the frame member 109. Belts, such as indicated at 218—218, extend around the double pulley 190 of each of the sewing machine heads and a similar double pulley on each motor shaft. As shown in Fig. 16, each sewing machine is driven by a separate motor and one of the motors is supported by a shelf 216 which is pivotally mounted on a supporting bracket 219 provided expressly for that purpose and mounted on the base 70.

The rock shaft 197 of the sewing machine is temporarily locked in the starting position in which it is illustrated in Figures 23 and 25. The means for locking the rock shaft in starting position consists of a block member 220 which is pivoted, as indicated at 221, to the lower arm of the sewing machine and which includes a projecting finger 222 which is adapted to engage a shoulder 223 formed in a collar 224 which is carried by the rock shaft 197. A spring 225 interposed between the pivoted block 220 and an adjacent side portion of the lower arm of the sewing machine head serves to normally urge the block to swing in a direction to cause the finger 222 to bear against the surface of the collar 224 and to engage the stop shoulder 223 when the latter is rotated sufficiently to permit the finger to drop behind the said shoulder.

The locking device 220—222 is disengaged from the stop shoulder 223 by means of cam pins 226—226 which are carried by a collar 227 secured to a vertically extending shaft 228 which serves to actuate certain of the sewing machine elements. The shaft 228 is rotated by means of a worm and worm wheel connection with the main driving shaft 188, as clearly illustrated in Fig. 23. The cam pins 226 are successively operable to engage the projecting end 229 of a member 230 which is adjustably mounted on the pivoted block 220, as shown in Fig. 23. It will be understood that the shaft 228 rotates one-half revolution for each stitching cycle and that upon the completion of each cycle, the locking finger and lever are disengaged from the stop shoulder 223, thereby permitting the spring 198 to rock the shaft 197 and the member 196 in the reverse direction for effecting disengagement of the driving pin 191 and arm 189.

Upon completion of the sewing or tacking operation, the sewing thread is severed beneath the work by means of a cutter 231 which is in the form of an elongated bar having its forward end provided with a cutting edge, the bar being longitudinally slidably mounted in a suitable bracket 232 provided in the lower arm of the sewing machine. The cutter 231 is moved from its normally stationary, inoperative position, as shown in Fig. 23, to advanced cutting position, as shown in Fig. 30, by means of a lever 233 which is pivotally mounted in the lower arm of the sewing machine, as indicated at 234. The opposite end of the lever 233 is connected to the slidable cutter 231 by means of a pin 235 which extends through an aperture in the cutter 231 and is movable in an elongated slot 236 in the cutter bracket 232.

The lever 233 is normally urged to move the cutter 231 into cutting position by means of a spring 237 stretched between the lever and a part of the sewing machine frame. Such movement is normally prevented by means of a cam disk 238 which is carried by the sewing machine shaft 228. The lever 233 is provided with a cam-engaging member 239 which is adjustably mounted on the lever, as clearly shown in Fig. 23, set screws 240—240 serving to clamp the member 239 in relatively fixed position with the lever, while an adjusting screw 241 serves to facilitate such adjustment and to prevent slippage of the member 239 relative to the lever 233. The adjusting screw 241 is threaded through an opening in a lug 242 which constitutes a part of the lever 233 and the front end of the adjusting screw engages the back of the cam-engaging device 239. The cam 238 is provided with a pair of diametrically oppositely disposed notches 243—243 which permit the cam-engaging head 239 to move towards the axis of the cam under the influence of the spring 237 and thereby permits the spring to actuate the thread cutter. As shown, the notches 243 are so formed that the cutter is promptly moved to its inoperative position against the tension of the spring 237 as an incident to slight additional rotation of the cam disk.

For stopping the sewing mechanism when the needle bar is in up position, the rock shaft 197 is provided with an arm 244 which carries an endwise projecting compression spring 245 in its outer end. When the rock shaft 197 is rocked to disengage the driving means previously described, the arm 244 is swung downwardly into the path of travel of the arm 189 which thereupon engages the compression spring 245. The spring 245 is a comparatively stiff spring which serves to quickly stop rotation of the arm 189 and shaft 188 while also absorbing most of the shock incident to such sudden stopping.

For holding the work in properly compressed condition to facilitate the tacking operation, a presser foot is provided for each sewing machine. Each presser foot consists of a lever 246 which is pivoted at its rear end, as indicated at 247, on the base plate portion of the upper arm 186 of the sewing machine. A flat spring 248, secured at its outer end to the bottom face of the presser foot arm near its free end, engages the base plate of the sewing machine head to normally urge the presser foot arm to move upwardly, out of operative position (see Fig. 16).

For lowering each presser foot in properly timed relation to the operation of the sewing machines, a cam 249 is provided on the shaft 71 and is adapted to actuate a rock lever 250 which is pivotally mounted, as indicated at 251, on the frame member 109. The rock lever 250 includes an arm 252 to which is connected a vertically movable rod 253, the latter being vertically slidably mounted in a suitable bearing 254 formed integral with or attached to the lever arm 187 of the sewing machine head. The rock lever 250 also includes an arm 256 which is connected by means of a link 257 to one arm of a bell crank 258, the latter being pivotally mounted, as shown at 259, on the frame member 109. A vertically movable rod 260, similar to the rod 253, is pivotally connected at its lower end to the other arm of the bell crank 258 and is vertically slidably supported in a bearing 254 constituting part of, or secured to, the lower arm 187 of the other sewing machine head. At their upper ends, the rods 253 and 260 are provided with arms 261—261 which extend inwardly over the adjacent presser-foot member 246. The cam 249 is so shaped and the rock lever 250 and bell crank 258 are so connected that the rods 253 and 260 will be simultaneously moved downwardly against the lifting tendency of the presser-foot springs 248. The presser-foot springs 248 will, of course, tend to move the rods 253 and 260 upwardly when permitted to do so by the cam 249, but to make such upward movement more certain, an elevating spring 262 may be connected between the arm 252 and a conveniently located portion of the frame member 109.

Upon completion of the tacking and thread-severing operation, the work is advanced one step so as to bring another line of quilting into registry with the needle. However, before or during the initial portion of the advancing movement of the work, it is desirable to pull the severed thread end upwardly through the work so that it will be in proper position to begin the next stitching operation.

For pulling the severed thread through the work, I provide thread-pulling arms 263 and 264 (see Figs. 18 to 22 inclusive), each of which includes an arm 265 pivotally mounted on a block 266 by means of a pivot pin 267. The arm 265 is formed at its pivotally mounted end with a U-shaped bracket portion 268 which embraces the block 266 and the upper leg of which is extended to form an arm 269. The block 266 is pivotally mounted by means of a cross-pin 270 which extends transversely of the pivot pins 267 and through the conveyor guide 168.

At its outer end, each arm 265 is provided with a spring-pressed plunger 271 which is normally urged outwardly by means of a spring 272, outward movement of the plunger being limited by means of a lug 273 formed integral with the rear end of the plunger and movable in a slot 274 in the top of the arm.

The arms 265 of the thread-pulling devices 263 and 264 are connected through the agency of a link 275 which connects the two arms 269 so that when one arm is moved, the other arm will be moved simultaneously in the opposite direction.

A spring 276 stretched between brackets 277—277 carried respectively by the arms 265— 265 serves to normally hold the arms in inwardly disposed position, substantially parallel with the sides of the guide bar 168, the projecting plunger members 271 being then disposed inwardly of the path of reciprocation and jogging of the sewing machine needle. The path of movement of the needle relative to the projecting plunger portions is indicated in Fig. 18 at 278.

For swinging the plungers outwardly from their normal inward position, I provide a cam 279 on the cam shaft 71 (see Fig. 16) which acts on one end of a rock lever 280 pivoted intermediate its ends on the frame 109, as indicated at 281. The upper end of the rock lever 280 is adjustably connected to one end of a length of chain 282, the other end of which is connected to one of the thread-pulling arms 265. The cam 279 is so shaped that, in properly synchronized relation with the completion of the sewing operation and starting of the work-advancing movement, the arm 280 will be rocked to pull the arm 265, to which the chain 282 is connected, outwardly, whereby, through the arm and link connections 269 and 275, the other arm 265 will also be swung outwardly.

It will be seen that upon such outward swinging movements of the arms 265 the projecting plunger portion crosses the path of the needle, wherefore it necessarily engages the thread which extends from the needle downwardly through the work. In its outward movement, the projecting plunger portion 271, hence, necessarily pulls the thread upwardly through the work, it being understood that the usual thread-tensioning devices of the sewing machine offer greater resistance of the movement of the thread than does the work through which the thread extends. The thread cannot escape the projecting plunger portions since the latter are disposed above the presser-foot ends which include eyes, as clearly shown in Fig. 31, through which the needle operates upon the work.

Return movement of the thread wiper or puller arms 265 is, of course, effected by the spring 276, but because of the fact that the presser foot must be raised to release the work to permit the advancing of the latter, it is necessary to retract the projecting plunger portions 271 to permit the same to pass by the needles of the sewing machines. By reference to Figs. 10 and 16, it will be understood that when the presser foot 246 of each sewing machine is raised, it is necessary to also raise the thread pullers to maintain the same in vertically spaced relation thereto, so that the thread pullers may complete their return movement.

For effecting retraction of the projecting plunger portions 271, a bracket plate 283 is mounted on the block 266 so that it may swing upwardly about the axis of the pin 270 but so that it is horizontally stationary. Each bracket plate 283 includes an outwardly projecting ear portion 284 which has affixed to its bottom side a cam plate 285. Upon outward movement of the arm 265, the lug 273 of the plunger engages the inclined cam surfaces 286 with the result that the bracket member 283 is displaced upwardly relative to the arm 265, this being permitted by reason of the resiliency of the bracket plate 283. When the arm 265 reaches its outer position, as shown in broken lines in Fig. 18, the lug portion 273 passes off the cam plate 285 and permits the latter to resume its normal position relative to the plunger. Then upon return movement of the arm 265, the lug 273 rides along the inclined cam surface 287 with the result that the plunger 271 is retracted to the position indicated in the fragmentary broken line illustrated at 288 in Fig. 18. It will be seen that when the plunger is retracted, it clears the path of travel of the needle and, hence, that the arm 265 may be restored to its normal inoperative position, even though the presser foot and the thread-pulling arm be moved upwardly to permit advancing of the work. Upward movement of the thread-pulling arms 265 is, of course, permitted by reason of the horizontal pivotal mounting of the arms on the pivot pin 270. The arms 265 are supported in their normal operative horizontal position by means of pins 289 carried by the heads 261 on the vertically movable rods 253 and 260. Upward swinging movement of the arms is thus obviously effected simultaneously with the upward or releasing movement of each presser foot 246.

It will be understood that a mattress boxing-strip is produced by the mechanism thus far described in detail in a continuous length. It is preferable to sever the strips so produced into lengths, each sufficient for boxing a mattress of predetermined size. For cutting the boxing-strips into such lengths, I provide a rotary saw 290 which is rotatably mounted, as indicated at 291, in the lower end of a bracket 292. The bracket 292 is provided with upwardly extending arms which at their upper ends are pivotally mounted, as indicated at 293—293, on suitably formed arms of a bracket 294 which is connected to or formed integrally with the bracket member 143, the latter being supported by the frame member 295 which is connected to the main frame member 109. The bracket memebr 295 is the part of the frame 109 which supports the sprockets 164 and 166 of the conveyor 62.

The shelf bracket 294 supports an electric motor 296 which is connected by means of suitable pulleys and a belt 297 to the shaft of the saw 290, whereby the latter is continuously rotated. The axis of the shaft of the motor 296 is substantially concentric with the pivotal connections 293—293 so that the bracket frame 292 may be swung about said pivotal connections without interfering with the driving of the saw 290.

The saw is normally held in a laterally offset, inoperative position relative to the discharge tube 141, as shown in Fig. 39, by means of a rod 298 which is pivotally connected at its upper end to the end of an arm 299 formed integral with the swinging bracket 292. The lower end of the rod 298 is connected to a lever 300 which is pivotally mounted, as indicated at 301, on the bracket portion 181 of the main frame 109. The arm 300 is also provided with an upwardly extending arm portion 302 which is provided with a projecting lug 303 adapted to be engaged by a hook 304. The hook 304 is secured to a shaft 305 which is pivotally mounted in a projecting bracket portion 306 of the frame bracket 181. A spring 307, stretched between a rod 308 carried by the base 70 and a portion of the lever 300, serves to normally tend to swing the lever 300 downwardly about the shaft 301, but is prevented from so doing by the hook 304.

For releasing the hook 304 to permit downward swinging movement of the lever 300 by the spring 307, a control disk 309 is mounted for rotation on the pivot shaft 301. The control disk 309 is mounted on the end of the shaft, as shown in Fig. 45, and is maintained in operative position by means of a spring-pressed arm 310 so that the control disk may be readily removed and replaced merely by disengaging the arm 310 in a manner which is obvious by inspection of said Fig. 45. The disk 309 is rotated step by step through the agency of ratchet teeth 311 on its periphery and a ratchet-engaging pawl 312 which is given a reciprocating movement by means of an eccentric mounting, indicated at 313, on the cam shaft 71. The disk 309 is provided with a cam block 314 which is adapted to engage a pin 315 carried by an arm 316 which is secured to the pivot pin 305. When the cam block 314 engages the pin 315, the arm 316 is swung upwardly, the pivot pin 305 being thereby rocked and the hook 304 being thereby disengaged from the lug portion 303 of the arm 302. The spring 307 is then permitted to pull the arm 300 downwardly, whereby the swinging saw support 292 is swung about its pivotal mountings 293—293, thereby causing the saw to traverse the path of travel of the border-strip in the tubular discharge member 141. For guarding against injury by reason of the sharp saw 290, a guard 317 is provided, this guard being in the form of a receptacle or channel through which the saw travels. The guard is rigidly or integrally connected with the discharge tube 141, and the supporting rods 142, previously mentioned, are connected between the opposite ends of the guard and the said frame bracket 143.

After the hook 304 has been released, and the arm 300 moved downwardly, as just described, the arm should be restored to its position and the hook 304 re-engaged to hold the saw in its inoperative position until a new length of boxing is completed. For restoring the parts to inoperative position, a cam 318 is provided on the cam shaft 71. This cam acts on a cam roller 319 carried by an arm 320 which is mounted for rocking movement on the pivot shaft 301. The arm 320 carries an adjustable screw 321 which is adapted to engage the upper end of the arm 302 when the arm 320 is swung outwardly by the cam 318, thereby to move the arm 302 to its normal position under the hook 304. The hook 304 is normally urged to move downwardly into locking position by a spring 322, and it is limited in its downward movement by a supporting bar 323 carried by the bracket arm 306.

It will be understood that each ratchet tooth in the disk 309 represents one step of feeding movement imparted to the work and that each length or strip of boxing which is severed from the strip produced will be equal in length to the total length of feed movements represented by the ratchet teeth.

In some instances, it is desired to insert ventilating or other devices in the mattress boxing-strip at predetermined spaced points. To facilitate proper positioning of such devices, I provide the marking arrangement including the markers 64, which was previously mentioned. The marking mechanism includes the arm 324 which is pivoted on a bracket 326 constituting a part of the frame member 295. The arm 324 is connected by means of a tie rod 327 to one end of an arm 328 which is similar to the arm 300. The arm 328 is provided with an upwardly extending hook-engaging arm portion 329 which is controlled by a hook member 330 pivotally mounted on the pivot pin 305. Formed integral with the hook member 330 is an arm 331, the forward end of which is adapted to engage cam blocks 332 carried by the control disk 309. The cam blocks 332 are circumferentially spaced apart in predetermined relation to raise the hook 330 out of engagement with the arm 329 at predetermined intervals so as to permit a spring 333 to pull the arm 328 downwardly, thereby to effect downward swinging movement of the marker arm 324. The free end of the marker arm 324 is provided with a suitable chalk or other marking material holder, as represented in Figure 39. Upon downward movement of the marking arm 324, the marking element engages the work in the tubular discharge member 141 through an opening 334 in said discharge member. Marks are thereby applied to the boxing strip as indicated at 368 in Figure 12. It will be understood that the cam blocks 332 may be located in any desired spaced relation to provide marks in any desired spaced relation along the length of each boxing strip. The cam 318 is operative through the arm 320 and an adjustable screw 321' to restore the arm 328 to up position, substantially as described for the arm 300.

For the purpose of facilitating proper registry of the sewing machines 60 and 61 with the lines of quilting of the quilted border-strip member, the sewing machines are preferably mounted so as to be capable of adjustment. For this purpose, the sewing machines are mounted in the sliding block 255, which as indicated in Fig. 11, is formed with a dove-tailed connection with the frame 109. A suitable set screw or other locking device (not shown) is provided for locking the supporting member 255 in the desired position of longitudinal adjustment. The front end of the sewing machine is supported by means of a lug 335 formed integral with the lower arm of each sewing machine, the said lug resting on a boss 336 provided on the mounting block 255 (see Figs. 1 and 11).

The rear end of the sewing machine is transversely adjustably mounted on the supporting block 255 through the agency of a short shaft 337 which may be rigidly secured in a bracket 338 secured to the rear end of each sewing machine (see Figs. 1 and 16). One end of the shaft 337 extends through and is slidable in an apertured boss 339 formed integral with the mounting block 255 and the other end of the shaft likewise extends into an apertured boss 340 formed at the other side of the mounting block. A spring 341 at one end of the short shaft 337 tends to pull the shaft and the sewing machine to one side, and a nut 342 threadedly engaging a threaded end portion of the shaft 337 is provided for holding the shaft and sewing machine head in set position against the tendency of said spring.

To further facilitate accurate adjustment or registry of the sewing mechanism with the lines of quilting, the upper sprockets 164 and 165 of the feed conveyor 62 are mounted on short shafts, such as 343 (see Fig. 36), the ends of which are carried in an eccentric hub 344—344, the latter being supported by suitable collars or the like formed on the respective frame members. Obviously, by turning the eccentric bearing block 344, the axis of the sprocket shaft 343 will be adjusted with corresponding adjustment of the tautness and location of the feed chain 162.

In some instances, it has been found that stitching machines of the type herein referred to fail to stop in the proper position, i. e., with their needles up. If, in the present machine, the sewing machine should come to rest with the needle in lowered position, the thread wipers or pullers 265 would, in the absence of some provision to prevent it, be caused to strike the needles and probably break the same. To prevent such an occurrence, I have provided an electric-control means for stopping the operation of the machine, i. e., of the cam shaft 71 which effects operation of the various elements including the thread-pulling devices. By reference to Figs. 23 and 28, it will be seen that I have provided an electric switch including upper and lower switch springs 345 and 346, respectively, which are secured to a block 347, the latter being pivoted for vertical rocking movement on a pivot 348 carried by a bracket 349. The springs 345 and 346 respectively carry contact elements 350 and 351 which are suitably mounted in the spring members so as to be insulated therefrom. A cam disk 352 is mounted for rotation on a shaft 353 which constitutes part of the lower thread-handling mechanism. The cam disk 352 is provided with a notch 354 which is designed to receive an offset portion 355 of the upper switch spring 345.

When the rock shaft 203 is returned to its normal position after the sewing machine has completed its operation and come to a stop, a lever 356 which is pivoted, as indicated at 357, on a suitable bracket carried by the frame, is rocked so as to cause its outer end to exert upward force on the lower switch spring 346. Such swinging movement of the lever 356 is caused by means of a rocker 358 carried by the rock shaft 203 and shaped to engage a lug 359 on the hub of the lever 356. Upward force against the lower switch spring 346 tends to rock the switch as a whole upwardly about the pivot 348. However, in the event that the needle of the sewing machine has come to rest at a point other than its proper up position, the notch 354 in the cam 352 will not be in alignment with the offset portion 355 of the upper switch spring member, in which case said offset portion will engage the periphery of the cam 352 and be thereby held against upward swinging movement. In such case, the lower spring member 346 will flex and the contact points 350 and 351 will be brought into engagement. It will, of course, be understood that each sewing machine head is equipped with a switch device, such as just described. Referring now to Fig. 29, the switch devices of the two sewing machine heads are represented in an electric circuit which controls an electric solenoid or other device 360 which controls a lever 361. The lever 361 is pivoted intermediate its ends as indicated at 362, and is provided at one end with a shoulder 363 which engages a stop pin 364 carried by a clutch-controlling arm 365. A spring 366 normally urges the lever 361 into locking engagement with the stop pin 364 of the clutch arm 365. When either of the sewing machine switches are closed, a circuit will be completed to independently actuate the electric device 360. The lever 361 is independently moved out of engagement with the stop pin 364 and a spring 367 is then permitted to swing the lever 365 to disengage the clutch 81. The drive of the cam shaft 71 of the machine is thus disconnected so that the machine will be stopped and damage to the sewing machine needles by the thread-pullers is prevented. It will also be understood that the machine cannot again be started until proper adjustments have been made so that the sewing machines will be stopped in proper up position and the cam notch 354 aligned with the offset spring portion 355. When the notch and offset portion are so aligned, the switch may, of course, swing as a unit about the pivot 348, and no contact will be made between the contacts 350 and 351.

It is obvious, of course, that many changes may be made in the described mechanism without departing from the operative principles of the mechanism shown or from the spirit of the invention, the scope of which should, therefore, be determined by reference to the following claims, the same being construed as broadly as possible consistent with the state of the art.

I claim as my invention:

1. In a machine for making mattress boxing strips, the combination of means for propelling a mattress boxing-strip member step by step, means for propelling a padding strip, means for folding said padding strip longitudinally upon itself, means for guiding said folded strip to a position adjacent a marginal portion of said member and wholly on one side of the latter, and means for uniting said folded padding strip to said boxing strip.

2. In a machine of the class described, the combination of means for assembling a quilted boxing-strip member and a padding strip into relatively superposed relation, sewing mechanism for securing said padding strip to said boxing-strip member, and means for actuating said sewing mechanism so as to secure said padding strip to said boxing-strip member, and adjustable means for advancing and controlling the position of the assembled strips relative to said sewing mechanism so as to cause the latter to unite the assembly at points substantially in register with points of quilting in said quilted member.

3. In a machine of the class described, the combination of means for supplying a boxing strip including outer and inner fabric strips and an interposed layer of padding material, means for supplying a padding strip of less width than said boxing strip, means for positioning said padding strip underneath a marginal portion of said boxing strip, a support for receiving said parts, means for positioning a tape strip on said support underneath said padding strip, means for advancing said boxing strip, padding strip and tape strip longitudinally in unison step by step, stitching mechanism operable during an interval of rest of said parts for tacking said boxing strip, padding strip and tape strip together at longitudinally spaced points, and means operative during such interval of rest for severing a predetermined length of said strip from its forward end portion.

4. In a machine of the class described, a conveyor for feeding a strip of padding material, means co-operating with said conveyor to crease the strip longitudinally intermediate its width, means for folding said padding strip longitudinally upon itself along the crease formed by said creasing means, and means for maintaining said strip folded while on said conveyor.

5. In a machine of the class described, a conveyor for feeding a strip of padding material, means associated with said conveyor for folding said padding strip longitudinally upon itself, means for maintaining said padding strip folded while on said conveyor, said means being hingedly mounted so as to be adjustable from operative to inoperative position to afford access to the normal path of travel of the folded strip, and releasable means for locking said fold-retaining means in operative position.

6. In a machine of the class described, the combination of a conveyor for propelling a strip of padding material, a tapered roll associated with said conveyor and having its axis disposed approximately parallel with the plane of the padding material strip, the smaller diameter of said roll being such as to exert no material pressure on the strip and the larger diameter of the roll serving to crease said padding strip longitudinally intermediate its width as an incident to the passage of said padding strip between the roll and said conveyor, and means also associated with said conveyor for folding said strip longitudinally upon itself along said crease.

7. In a machine of the class described, the combination of a conveyor for simultaneously propelling a pair of padding material strips in substantially co-planar but transversely spaced relation, means for maintaining said padding strips in said spaced relation, said padding strips being of such width that portions thereof project beyond the respective side edges of said conveyor, means for supporting said projecting side edges, and means for folding said projecting portions into relatively superposed relation to the respective portions thereof which overlie said conveyor.

8. In a machine of the class described, the combination of a support, means for delivering to said support in relatively superposed relation a padding strip and a mattress boxing-strip member, means for propelling said relatively superposed parts along said support comprising an endless conveyor, means for intermittently actuating said conveyor, and bars extending transversely of and carried by said conveyor for engaging said relatively superposed parts in longitudinally spaced, transversely extending zones so as to thereby impart movement to said parts as an incident to the movement of said conveyor.

9. In a machine of the class described, the combination of a support, means for delivering to said support in relatively superposed relation a padding strip and a mattress boxing-strip member, means for propelling said relatively superposed parts along said support comprising an endless conveyor, means for intermittently actuating said conveyor, and bars extending transversely of and carried by said conveyor for engaging said relatively superposed parts in longitudinally spaced, transversely extending zones so as to thereby impart movement to said parts as an incident to the movement of said conveyor, and means for uniting said parts intermediate said zones of engagement.

10. In a machine of the class described, the combination of a support, means for delivering to said support in relatively superposed relation a padding strip and a mattress boxing-strip member, means for propelling said relatively superposed parts along said support comprising an endless conveyor, means for intermittently actuating said conveyor, bars extending transversely of and carried by said conveyor for engaging said relatively superposed parts in longitudinally spaced, transversely extending zones so as to thereby impart movement to said parts as an incident to the movement of said conveyor, means for uniting said parts intermediate said zones of engagement, and means for adjusting said conveyor relative to said uniting means to thereby accurately locate the points of union in predetermined position intermediate said zones of engagement.

11. The method of making mattress boxing having a padding strip extending along one of its marginal portions, which consists in propelling a pair of fabric strips into relatively spaced superposed relation, propelling a web of padding material into the space between said fabric strips, uniting said assembled strips together at longitudinally spaced points, continuing the movement of said strips after they are united, propelling a padding strip into assembled relation with a marginal portion of said united strips, and uniting said marginal padding strip to said united strips.

12. The method of making mattress boxing having a padding strip extending along one of its marginal portions, which consists in propelling a pair of fabric strips into relatively spaced superposed relation, propelling a web of padding material into the space between said fabric strips, uniting said assembled strips together at longitudinally spaced points, continuing the movement of said strips after they are united, propelling a padding strip upwardly beneath said united strips into assembled relation with a marginal portion of the latter, and uniting said padding strip to the previously united strips.

13. The method of making a quilted matress boxing having a padding strip extending along one of its marginal portions, which consists in propelling a pair of fabric strips into relatively spaced superposed relation, propelling a web of padding material into the space between said fabric strips, uniting said assembled strips together at longitudinally spaced points, continuing the movement of said strips after they are united, propelling a strip of padding, folding said padding strip longitudinally upon itself as an incident to its travel, guiding the folded padding strip into assembled relation with a marginal portion of said united strips, and then uniting said folded padding strip to said united strips.

14. In a machine for making mattress boxing strips, the combination of a stationary support, means for delivering a mattress boxing strip to said support, means for delivering a padding strip of less width than said boxing strip and positioning the padding strip with one face in engagement with a marginal face portion of the boxing strip, means for supplying and positioning a relatively narrow tape strip in predetermined relation to the other face of said padding strip, means acting on portions of said strips on said support for uniting said box, padding and tape strips and means acting on portions of certain of said strips for advancing the latter relative to said uniting means.

15. In a machine for making mattress boxing strips, the combination of a support, means for delivering a padding strip to said support, means for delivering a mattress boxing strip to superposed and laterally offset relation to said padding strip on said support, means for positioning a relatively narrow tape strip on said support beneath and intermediate the width of said padding strip, and means for uniting said padding, boxing and tape strips so as to maintain the same in assembled relation.

16. In a machine of the class described, the combination of a support, means for delivering to said support in relatively superposed relation a padding strip and a mattress boxing strip, means for propelling said relatively superposed strips along said support and comprising an endless conveyor, longitudinally spaced devices carried by and projecting laterally beyond one side of said conveyor for engaging said superposed strips at longitudinally spaced points, and means for uniting said strips intermediate said points of engagement of the conveyor.

17. In a machine of the class described, the combination of a support, means for delivering to said support a mattress boxing strip, means for feeding a pair of spaced padding strips to relatively superposed, assembled relation respectively with the opposite marginal portions of said boxing strip, means for propelling said assembled strips comprising an endless conveyor disposed intermediate the width of said assembled strips, and a series of devices carried by said conveyor and projecting laterally beyond both sides of the conveyor for engaging said assembled strips, and means for uniting said strips at points located intermediate said devices.

18. In a machine of the class described, the combination of means for delivering and supporting a pair of fabric strips in relatively superposed relation with a padding strip interposed therebetween, means for intermittently advancing said strips, means for stitching said strips together in said relation at longitudinally spaced points so as to form a quilted mattress boxing strip, said stitching means being successively operable during periods of rest of the strips, means for delivering a narrow padding strip to relatively superposed relation to a marginal portion of said quilted boxing strip, means for effecting step-by-step advancement in unison of said quilted strip and narrow padding strip, and means also operative during said periods of rest of said strips for stitching said narrow padding strip to said quilted strip.

19. In a machine for making mattress boxing strips, the combination of means for propelling a mattress boxing strip member, means for propelling a padding strip, means for folding said padding strip longitudinally upon itself, means for guiding said folded strip to a position adjacent a marginal portion of said member and wholly on one side of the latter, and means for uniting said folded padding strip to said boxing strip.

JOHN F. GAIL.